United States Patent
Kohári

(10) Patent No.: US 12,466,463 B2
(45) Date of Patent: Nov. 11, 2025

(54) STEERING SYSTEM FOR USE IN TEST DRIVING OF AN AUTONOMOUS VEHICLE AND DISENGAGEMENT METHOD

(71) Applicant: aiMotive Kft., Budapest (HU)

(72) Inventor: Roland Kohári, Jászberény (HU)

(73) Assignee: aiMotive Kft., Budapest (HU)

( * ) Notice: Subject to any disclaimer, the term of this patent is extended or adjusted under 35 U.S.C. 154(b) by 131 days.

(21) Appl. No.: 18/577,835

(22) PCT Filed: Jun. 28, 2022

(86) PCT No.: PCT/HU2022/050054
§ 371 (c)(1),
(2) Date: Jan. 9, 2024

(87) PCT Pub. No.: WO2023/281283
PCT Pub. Date: Jan. 12, 2023

(65) Prior Publication Data
US 2024/0343293 A1  Oct. 17, 2024

(30) Foreign Application Priority Data
Jul. 9, 2021  (HU) .................................. P2100263

(51) Int. Cl.
*B62D 1/28* (2006.01)
*B62D 5/04* (2006.01)

(52) U.S. Cl.
CPC ............. *B62D 1/286* (2013.01); *B62D 5/046* (2013.01)

(58) Field of Classification Search
CPC ...... B60W 50/10; B60W 10/04; B60W 10/18; B60W 10/20; B60W 50/16; B60W 10/184;
(Continued)

(56) References Cited

U.S. PATENT DOCUMENTS

2003/0221898 A1*  12/2003  Yasui ................... B62D 5/0472
                                                              180/446
2006/0015228 A1*   1/2006  Lange .................. B62D 5/0457
                                                              180/443
(Continued)

FOREIGN PATENT DOCUMENTS

DE        10255751 A1    6/2004
EP         1972482 A2    9/2008
EP         3763603 A1    1/2021

OTHER PUBLICATIONS

International Searching Authority, Written Opinion issued in PCT/HU2022/050054, mailed Oct. 17, 2022 (6 pages).
(Continued)

*Primary Examiner* — Sizo B Vilakazi
(74) *Attorney, Agent, or Firm* — Joseph L. Falkiewicz

(57) ABSTRACT

The invention is a steering system for use in test driving of an autonomous vehicle, comprising—a manual steering means configured to manually steer the vehicle, —a steering axle (30) attached to the manual steering means, and—a direct drive motor (35) controllably affecting a torque on the steering axle (30), wherein the direct drive motor (35) has an axis (37) of rotation being coaxial with the steering axle (30). The steering system is characterized in that—it has at least two predefined states characterizing different driving conditions, wherein each predefined state has at least one predefined disengagement limit, and—it further comprises a controller assembly operable based on a control parameter, the controller assembly being configured to detect an actual predefined state of the vehicle, and the controller assembly initiates a disengagement of the direct drive motor (35) if, based on a difference value between a prescribed value of the control parameter and an actual value of the control parameter, the at least one predefined disengagement limit corresponding to the actual predefined state is reached. The
(Continued)

invention further relates to a disengagement method, and a data processing system, a computer program product and a computer readable medium carrying out the method.

14 Claims, 10 Drawing Sheets

(58) Field of Classification Search
CPC ............ B60W 50/04; B60W 2540/10; B60W 2540/12; B60W 2540/18; B60W 50/14; B62D 5/0481; B62D 5/001; B62D 5/0484; B62D 6/008; B62D 5/006
See application file for complete search history.

(56) References Cited

U.S. PATENT DOCUMENTS

| | | | |
|---|---|---|---|
| 2006/0195238 A1* | 8/2006 | Gibson | G05D 1/0061 701/23 |
| 2012/0130596 A1* | 5/2012 | Ooiwa | B60K 15/03519 701/45 |
| 2014/0214275 A1* | 7/2014 | Miller | B62D 5/04 701/41 |
| 2016/0334790 A1* | 11/2016 | Rust | B60T 13/662 |
| 2019/0041847 A1* | 2/2019 | Silberling | B62D 15/025 |

OTHER PUBLICATIONS

International Searching Authority, Search Report issued in PCT/HU2022/050054, mailed Oct. 17, 2022 (4 pages).

\* cited by examiner

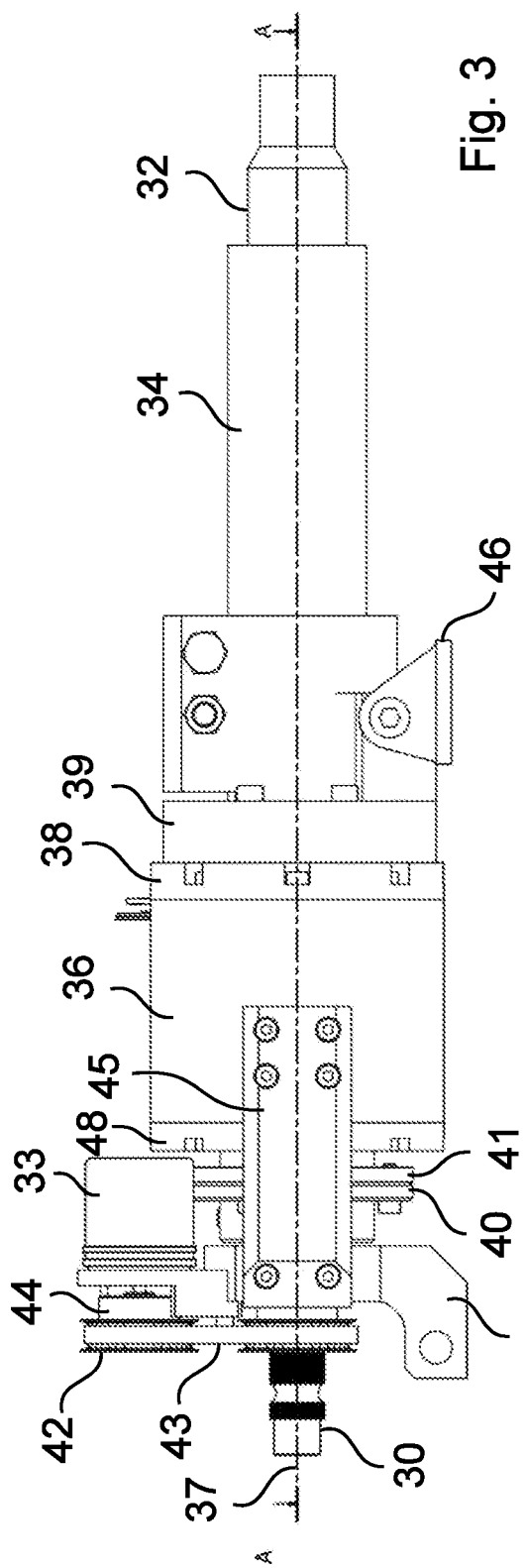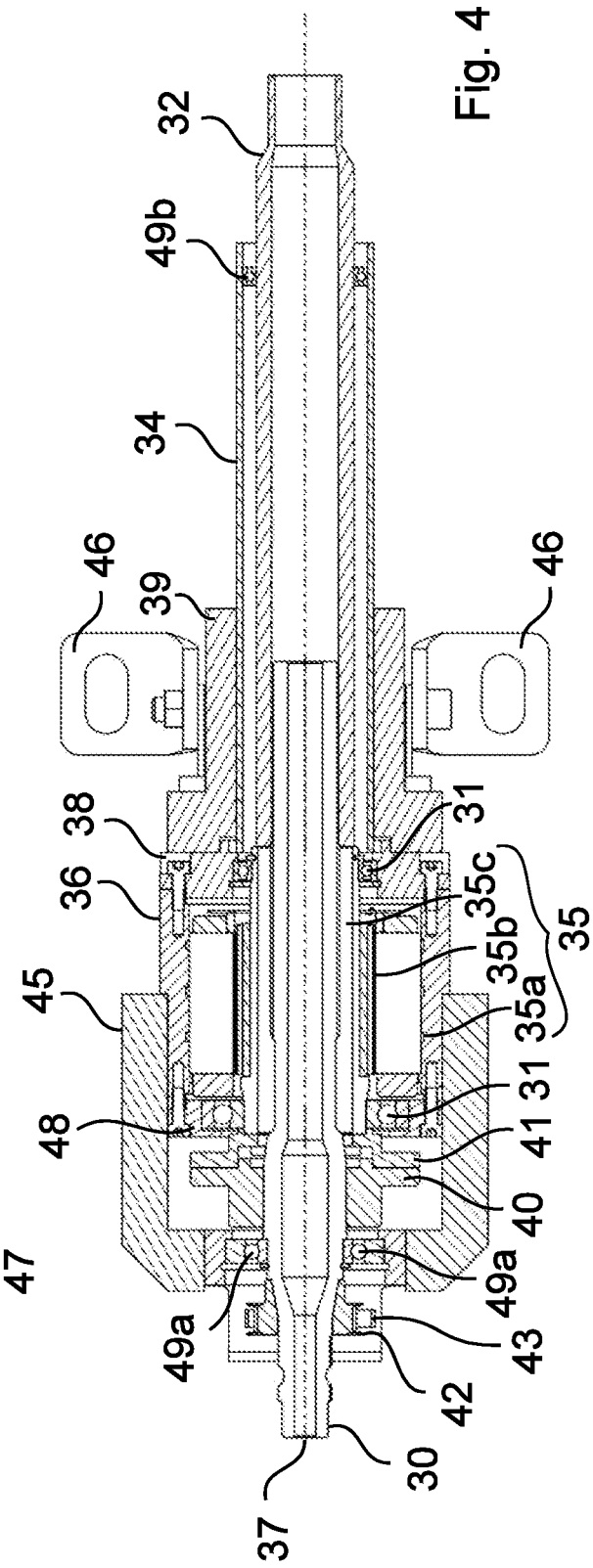

STEERING SYSTEM FOR USE IN TEST DRIVING OF AN AUTONOMOUS VEHICLE AND DISENGAGEMENT METHOD

This application claims priority under Section 120 and/or Section 371 to PCT Application No. PCT/HU2022/050054, filed Jun. 28, 2022, which claims priority to HU P2100263, filed Jul. 9, 2021, each of which is expressly incorporated by reference herein, in its entirety.

TECHNICAL FIELD

The invention relates to a steering system for use in test driving of an autonomous vehicle. The invention also relates to a disengagement method, and to a data processing system, a computer program product and a computer readable medium implementing the method.

BACKGROUND ART

People are seeking for easier and more pleasant driving experience; thus, various solutions are known in the art to assist drivers in steering a vehicle. Vehicles with autonomous, self-driving functions are also known, i.e., vehicles that are capable of driving themselves without or with minimal user-intervention.

US 2003/0221898 A1 discloses a motor-driven steering controller which is adapted to reduce steering torque during counter-steering operation. An EPS motor is provided to steer the front wheels via a reduction gear and a rack-and-pinion thereby reducing the operator's power to operate the steering wheel, thus assisting the operator in driving the vehicle. The motor is not directly attached to the shaft of the steering wheel, but through gears, which requires additional moving components that are prone to wear and failure. A steering torque necessary for counter-steering assist is calculated and executed, however, the operator can override the steering operation in case of an erroneous calculation. The document does not disclose ways to ensure a safe override.

US 2006/0015228 A1 discloses a method and system for steering dead band in a mobile machine such as an agricultural vehicle. The method includes that the operator manually measures the value of the dead band, and this dead band value is used in a controller to compensate for the dead band, therefor mitigating the undesirable effects associated with the dead band. The system includes an electric motor which is reversible, thus it can turn the steering wheel in a clockwise or counter-clockwise direction. The current of the electric motor is calibrated so that the steering wheel is turned without generating an excessive torque which allows an override by a user. The motor is again not a direct drive motor thus additional gears are required to transfer the torque of the motor to the steering wheel.

US 2006/0195238 A1 discloses a method and system for implementing automatic vehicle control with parameter-driven disengagement, wherein the vehicle is an agricultural vehicle such as a tractor or a harvester. The vehicle is automatically guided along a predefined route, and if a predefined parameter is exceeded, the steering command for automatic driving is suspended until a new engagement signal is received. The predefined parameter for the system can be a minimum vehicle speed, a maximum vehicle speed, an approach angle between the vehicle and the vector of the route, a cross-track error limit, a braking of the vehicle, a signal of a seat switch or a time out sensor, an excessive tilt or roll of the vehicle, an excessive acceleration, etc. or a manual override by a user. The vehicle preferably utilizes a non-geared electric motor.

EP 1 972 482 A2 discloses a steering drive system, preferably for industrial trucks. The steering drive system comprises a steering drive unit having a motor which, when activated drives an adjusting wheel via a drive shaft. The document discloses a steer-by-wire solution, wherein a brushless electric motor is connected to the steering system. When the adjusting wheel is driven by the motor, the driver or operator can feel a direct connection between the steering device and the adjusting wheel.

US 2012/0130596 A1 discloses a vehicle guidance system, wherein the vehicle is an agricultural vehicle and it is guided along a predetermined path to ensure efficient use of fuel or agricultural materials. The vehicle includes a steering wheel assembly having a steering wheel and a hub, wherein the hub is connected to a steering shaft, and a drive assembly to directly drive the steering wheel assembly. The axis of the drive assembly is coaxial to the steering wheel assembly. The document does not disclose a torque limits that the drive assembly cannot exceed, thus it is not ensured that the driver can take over the control of the vehicle any time when it seems necessary, e.g., to avoid an accident.

US 2014/0214275 A1 discloses a steering controller for precision farming. The steering controller can rotate a steering shaft of the vehicle in order to direct the vehicle on a desired path. A hub can be coupled to the steering shaft of the vehicle, and a motor can rotate the steering shaft by rotating the hub. The vehicle is preferably an agricultural vehicle, and its steering system is typically a hydraulic based system. The operator can take over the control of the vehicle by rotating the steering wheel; however, the document does not disclose how is it possible.

US 2016/0334790 A1 discloses an autonomous vehicle retrofitting system. A steering motor is utilized to apply torque to the steering column, wherein the steering motor can be an electric motor such as a brushed or a brushless motor, and it interfaces with the steering column via a pulley or gear. A user invention can be detected, and the user can take over the control of the vehicle; the system can even derive the direction of the user-applied torque.

In view of the known approaches, there is a need for a steering system that can be used for testing autonomous vehicles in various traffic situations and driving conditions, and which allows intervention of a user or driver in case of an unexpected or dangerous situation that might occur during testing. There is also a need for a steering system that allows disengagement and override by the user during testing, especially in cases of failures or problems with an autonomous steering of the vehicle.

DESCRIPTION OF THE INVENTION

The primary object of the invention is to provide a steering system for use in testing of an autonomous vehicle, which is free of the disadvantages of prior art approaches to the greatest possible extent.

The term "autonomous vehicle" refers to any vehicles that are at least partially operable without intervention of a human driver, for example a self-driving car, a semi-automated vehicle that has a self-driving or autonomous driving function, wherein the self-driving or autonomous driving function can be limited to certain road or environmental conditions or driving situations (such as automated parking), or any conventional vehicles equipped with means for allowing an autonomous drive of said vehicle (such as a vehicle with a driving robot).

In the near future, transportation is expected to be fully automated via the use of autonomous vehicles that can operate even without any human intervention. Such vehicles, however, need to be tested in order to ensure the safety of the users, passengers, the transported goods, the vehicles themselves and any other person, vehicle or object along the route of the autonomous vehicle. For example, redundant hardware and software solutions are required to fulfill the necessary safety requirements. The software responsible for the autonomous driving of the vehicle must be safe and it should be prepared for safe maneuvering of the vehicle in any possible environmental, vehicle and traffic conditions, including rare and unexpected events.

Some vehicles are designed to have semi-automated solutions, i.e., wherein under certain conditions the vehicle can autonomously drive itself, however, a human driver is necessary to intervene in case of a dangerous or unexpected situation.

In order to ensure a safe operation and the conformity with the safety regulations, the autonomous vehicle and its software responsible for driving the vehicle need to be thoroughly tested. Such a test needs to include various driving scenarios that might happen during the actual use of the vehicle thus also including driving in public roads in traffic.

The object of the invention is to provide a steering system that allows safe testing of autonomous vehicles in traffic conditions and various driving situations, and also allows testing of vehicles on different level of automation, even a fully automated vehicle.

A major issue with self-driving vehicles is that most of the self-driving features are intended to be used only under certain conditions (e.g., on highways, urban areas, in specific weather conditions, in the dark or at night etc.) and therefore suffer from "brittleness." Brittleness refers to the phenomenon that the automated features of a vehicle function well under the conditions under which it was intended to be used, but the system requires human intervention to handle situations that the software was not designed to handle. Therefore, it results in a challenge for the human driver, i.e., the human driver needs to realize that the automation is not performing correctly and needs to understand why is it not performing correctly. Research on the human factors have shown that humans are slow to detect a problem with an automation and are also slow to understand the problem even after the problem is detected. When failures with the automation occur, unexpected transitions that require a driver to take over or resume manual control of the vehicle can occur suddenly and the driver may not be ready for taking over the control of the vehicle. Accordingly, a further object of the invention is to provide a steering system that allows a safe disengagement and override even in various driving situations and traffic conditions.

The further object of the invention is to provide a disengagement method to allow a driver or user to take over the control of the vehicle.

Furthermore, the object of the invention is to provide a data processing system comprising means for carrying out the steps of the method, a non-transitory computer program product for implementing the steps of the method according to the invention on one or more computers, and a non-transitory computer readable medium comprising instructions for carrying out the steps of the method on one or more computers.

The objects of the invention can be achieved by the steering system according to claim 1. The objects of the invention can be further achieved by the method according to claim 10, by the data processing system according to claim 12, by the non-transitory computer program product according to claim 13, and by the non-transitory computer readable medium according to claim 14. Preferred embodiments of the invention are defined in the dependent claims.

The main advantage of the steering system according to the invention compared to prior art approaches comes from the fact that it allows for testing of an autonomous vehicle even on different levels of automation in various driving situations, and thus contributes to safer autonomous vehicles that are less prone to failures and accidents.

A further advantage of the steering system according to the invention is that it can be used by a trained safety driver as well as any driver, because the steering system can be operated as any conventional steering system, thus no special skills are necessary for driving the test vehicle. Optionally, the steering system according to the invention could also work without a driver, e.g., for testing vehicles of a robot taxi company on public roads or preferably on closed areas where no other vehicles are allowed to enter during testing.

Additionally, the steering system according to the invention can be used for training test drivers. The training can include driving a test vehicle equipped with the steering system according to the invention, or the steering system according to the invention can be mounted on a test bench or any other simulation environment providing realistic training for test drivers in a safe and secure test environment.

The steering system according to the invention can be implemented in fully automated vehicles without means for manual steering such as a steering wheel or joystick, and also in vehicles having means for manual steering, i.e., semi-automated vehicles or vehicles having self-driving functionalities in certain conditions. In the first case the addition of a means for manual steering allows for a more complex testing of an autonomous vehicle in a safe manner, i.e., a human driver might intervene if an unexpected or faulty behaviour of the vehicle is detected, thus the vehicle can be tested not only on a closed track, but on regular roads in real traffic conditions. In the latter case the steering system can be built onto the existing steering axle of the vehicle.

The steering system according to the invention can be used for professionally and thoroughly testing the quality of an autonomous vehicle, or one or more autonomous or self-driving functions or features of the vehicle.

The steering system according to the invention is designed to test technologies on different levels of automation, preferably from level 1 to level 5 of automation. Level 5 automation does not require human driver, but for development and fine-tuning purposes of the autonomous driving software, it might be preferred to have a test vehicle having an interface for manual steering, e.g., a steering wheel, a joystick or any mechanism which can provide a safe manual driving input during testing. Such a manual intervention of a driver can ensure the safety of the vehicle and its environment even If the software responsible for the automated driving has some faults or bugs, or an unexpected situation occurs during the test drive.

For example, a level 1 automation requires a driver to be physically operating the vehicle with a hand and/or a foot (but not necessary both) at all times. An example of level 1 automation is an adaptive cruise control that helps the driver to keep a safe distance from other vehicles. A level 2 automation requires a driver to monitor the roadway and to be always available for taking over the control, preferably on a short notice. An example of level 2 automation is self-parking. In case of a level 3 automation, a driver is expected to be available for occasional control, but with sufficiently comfortable transition time. An example of a level 3 vehicle is one that can navigate on a highway, preferably including driving on-ramps and off-ramps, on its own without any driver intervention. At level 4, a driver should provide a destination or a navigation input, but the driver is not expected to be available for taking over the control at any time during the trip. Currently, there are no level 4 vehicles on the market, however a level 4 vehicle should be capable of completing an entire trip from an origin to a destination without any driver input or intervention. Automation levels 1 to 4 all require drivers to monitor the automated vehicle to make sure it is performing as expected, and to intervene (resume control) in situations that the automated vehicle cannot handle.

It has been recognized that by implementing a drive motor directly on the steering axle of the vehicle, an excellent dynamic performance and a comfortable driving experience can be achieved as the direct drive motor adds only a very little inertia to the steering that can be unnoticed by the driver, thus a usual driving experience can be provided. Furthermore, an accurate control of position and speed of the steering can be reached as the direct drive motor can directly drive the vehicle and a need for an additional transmission system or gears, pulleys, gearings, etc. are eliminated. Without an additional transmission system or gears no backlash or wear is expected, which improves the reliability of the steering system according to the invention, furthermore, it reduces the number of moving parts within the steering system, which also contributes to a more reliable operation of the steering system. A reduced number of moving parts enhances the energy efficiency of the steering system as losses in intermediate mechanical parts can be eliminated, and less parts apply less weight onto a steering column which allows for an easier and precise drive. All this together result in a smaller ecological footprint of the steering system.

A further advantage of the steering system according to the invention is its compact size with low axial dimension and large bores that allows for mounting the steering system into a large variety of vehicles for testing purposes.

The steering system according to the invention with a direct drive motor has a high torque to inertia ratio and a high torque to mass ratio, a low torque ripple or cogging, and a high torque even at low speeds.

The steering system according to the invention furthermore has a low acoustic noise and a low level of self-induced vibration due to the direct drive and the smaller number of parts of the steering system. A smaller number of parts also reduces the need and frequency of maintenance.

In certain embodiments the steering system is implemented with relatively large airgaps between the part of the steering system, which reduces the cooling requirements and also results in a relatively high shock-resistance and also resilience in dirty environments.

The steering system according to the invention therefore can be used in testing of any autonomous vehicles.

BRIEF DESCRIPTION OF THE DRAWINGS

Preferred embodiments of the invention are described below by way of example with reference to the following drawings, where FIG. 3 is a side view of a preferred embodiment of the steering system according to the invention, FIG. 4 is a cross section of the preferred embodiment of the steering system according to FIG. 3.

MODES FOR CARRYING OUT THE INVENTION

Figure 1:
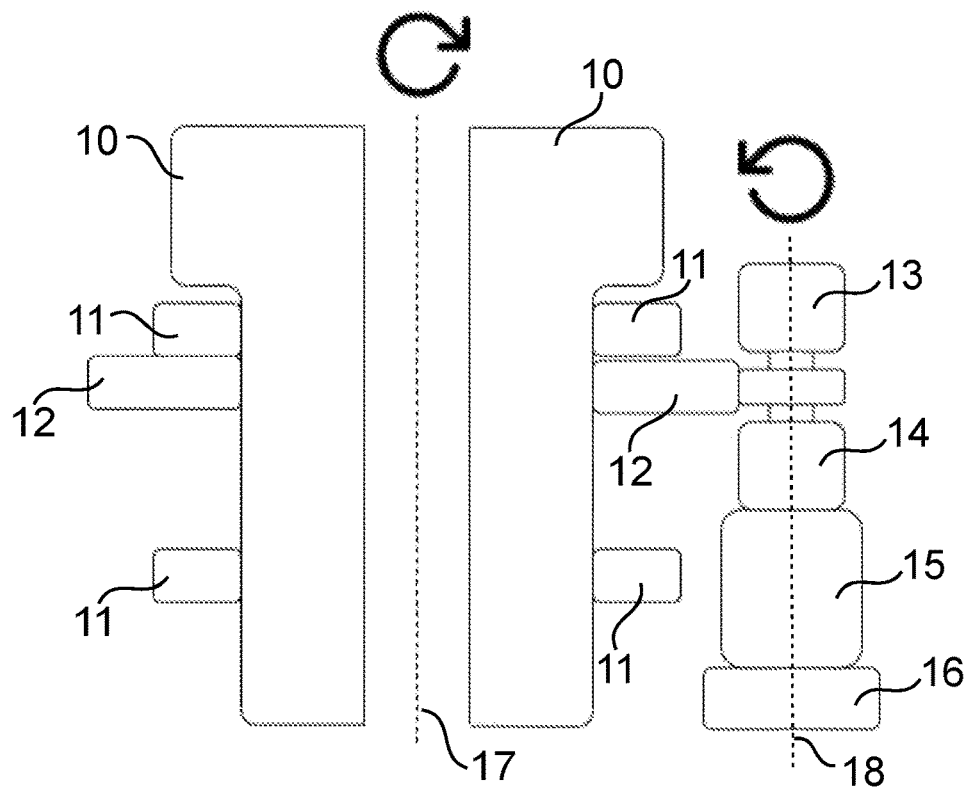
FIG. 1 is a schematic view of a cross-section of a traditional motorized steering drive arrangement.

The invention relates to a steering system for use in testing of an autonomous vehicle. The steering system according to the invention comprises a manual steering means configured to manually steer the vehicle, so that a driver or user can override the steering system or can take over the control of the vehicle in order to avoid accidents or dangerous situations and to ensure the safety of the vehicle being tested as well as its environment including other vehicles, objects, passengers, etc. The manual steering means is preferably a steering wheel, a joystick, or any other handle that can be used for manually steering the vehicle.

The steering system according to the invention further comprises a steering axle attached to the manual steering means, and a direct drive motor controllably affecting a torque on the steering axle, wherein the direct drive motor has an axis of rotation being coaxial with the steering axle. The direct drive motor is preferably a permanent-magnet synchronous motor such as a brushless DC motor.

The steering system according to the invention has at least two predefined states characterizing different driving conditions, wherein the driving conditions preferably comprising at least one of the following: a parking maneuver, a traffic jam, an urban driving, a suburban driving, a low-speed driving, a high-speed driving, an emergency maneuver, and a closed track driving. Preferably, the predefined states are determined based on at least one state parameter, wherein the at least one state parameter is the speed, lateral acceleration, yaw rate, and/or longitudinal acceleration of the vehicle.

Each predefined state has at least one predefined disengagement limit, and exceeding a predefined disengagement limit preferably initiates a disengagement of the direct drive motor. Preferably, in case of a disengagement a driver or user of the vehicle is notified and requested to take over the control of the vehicle.

The steering system according to the invention further comprises a controller assembly that is operable based on a control parameter. The control parameter is preferably a position of the manual steering means, a torque on the manual steering means, a force on the manual steering means, a speed of the manual steering means, or a direct drive motor current.

The controller assembly is configured to detect an actual predefined state of the vehicle, and the controller assembly includes a motion controller, a motor drive unit and a feedback device. The motion controller is configured to generate a command including a prescribed value of the control parameter to be reached. The motor drive unit is configured to supply power to the direct drive motor based on the command received from the motion controller, and the feedback device is configured to monitor an actual value of the control parameter and to determine a difference value between the prescribed value of the control parameter according to the command and the actual value of the control parameter. The feedback device is further configured to initiate a disengagement of the direct drive motor if, based on the difference value, the at least one predefined disengagement limit corresponding to the actual predefined state is reached.

The motion controller preferably comprises a high-level controller and a low-level controller, wherein the high-level controller preferably generates a motion profile comprising prescribed values of the control parameter for the direct drive motor, and the low-level controller receives the motion profile and generates the command including a prescribed value of the control parameter to be reached.

The controller assembly preferably further comprises a drive-by-wire unit arranged between the high-level controller and the low-level controller for transforming the motion profile generated by the high-level controller into a signal receivable by the low-level controller.

The steering system according to the invention preferably has at an intermediate bridge state between two predefined states providing a smooth transition between the disengagement limits of the two predefined states.

Preferred embodiments of the steering system according to the invention are described below in more detail in connection to FIGS. 1 to 17.

FIG. 1 is a schematic view of a cross-section of a traditional motorized steering drive arrangement comprising a steering axle 10 driven by a motor 15, wherein the motor 15 is attached to the steering axle 10 through a drive gear 12 and a reduction gearbox 14. Around the steering axle 10 preferably at least one bearing 11 is arranged. The steering axle 10 is rotatable around a first axis 17 and the motor 15 is rotatable around a second axis 18. In traditional motor drive arrangements such as in FIG. 1, the first axis 17 and the second axis 18 neither coincide nor are coaxial, thus the need for the drive gear 12 arise. Preferably, an angle sensor 13 is attached to the motor 15 to measure the rotation of the motor 15 which can be used to indicate a position of a steering wheel attached to the steering axle 10 as a means for manual steering. The angle sensor 13 typically also rotates around the second axis 18. In case the motor 15 is a brushless DC motor (BLDC motor) then it is preferably equipped with a commutation encoder 16 to generate commutation signals for commutating the brushless DC motor. The commutation encoder 16 is preferably also arranged to rotate around the second axis 18, i.e., the axis of the motor 15.

Figure 2:
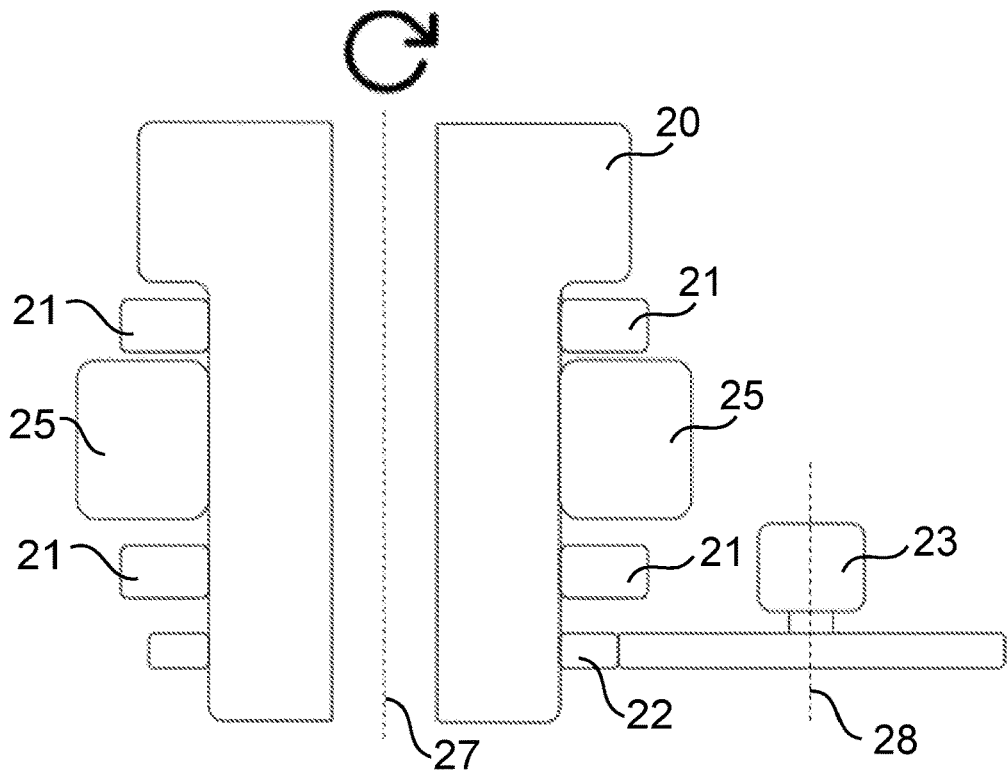
FIG. 2 is a schematic view of a cross-section of a preferred steering system according to the invention having a direct drive motor.

Contrary to FIG. 1, FIG. 2 illustrates a cross-section of a steering system according to the invention, which includes a steering axle 20 rotatable around a first axis 27 and a direct drive motor 25 that is also rotatable around the first axis 27 of the steering axle 20. The steering system preferably further comprises at least one bearing 21 around the steering axle 20. The steering system preferably further includes an angle sensor 23 that is attached to the steering axle 20 via gears 22, and the angle sensor 23 is rotatable around a second axis 28 preferably arranged parallel to the first axis 27 of the steering axle 20 and the direct drive motor 25.

An example is given below for the implementation of the steering system according to the invention. The steering system according to the example includes the following hardware components:

- a brushless DC motor (BLDC motor) as a direct drive motor 25 having a passive cooling and an aluminum alloy housing, wherein the aluminum alloy is preferably a 7075 aluminum alloy (AA7075),
- an absolute multiturn encoder with optical scanning as an angle sensor 23 that is capable of a precise position measurement, even for position above 360°,
- a high-performance servo-drive preferably having a continuous RMS current of 18 A and a peak RMS current of 36 A,
- a temperature sensor for the windings of the rotor of the direct drive motor 25 to monitor the temperature of the windings,
- a boost converter (preferably having a specification of 12V/48V and 50 A) for supplying power for the direct drive motor 25, and
- a steering axle 20, which is preferably an original (OEM) steering column of a vehicle to be tested.

FIG. 3 and FIG. 4 are showing a preferred embodiment of the steering system according to the invention, wherein FIG. 3 is a side view and FIG. 4 is a cross-sectional view of the steering system.

The steering system according to FIGS. 3 and 4 includes a direct drive motor 35 having a stator 35a, a rotor 35b and a motor shaft 35c, wherein the direct drive motor 35 is rotatable around an axis 37. The motor shaft 35c is arranged around a steering axle 30 such that the axis 37 of the motor shaft 35c is coaxial to the axis of the steering axle 30, i.e., both the steering axle 30 and the motor shaft 35c are rotatable around the axis 37. Preferably, the steering axle 30 is an original steering column of the vehicle to be used for the test drive.

The direct drive motor 35 is preferably arranged in a motor housing 36. In order to provide a sufficiently rigid contact between of the stator 35a of direct drive motor 35 and the motor housing 36, a bonding method is used, preferably in a form of a special adhesive. The same bonding method can be applied between the rotor 35b and the motor shaft 35c. The motor housing 36 of the direct drive motor 35 preferably uses original bolts holes of the steering axle 30 for fixing the motor housing 36 to the steering axle 30.

Preferably, one or more first bearing 31 is arranged around the motor shaft 35c, in the preferred embodiment according to FIGS. 3 and 4 the direct drive motor 35 has two first bearings 31 that are arranged in respective bearing housings 38, 48.

The direct drive motor 35 has low inertia due to its compact size, therefore it can precisely turn a steering wheel attached to the steering axle 30 into a requested position if a controller assembly controlling it has been fine-tuned or calibrated. As a further advantage, the compact sized direct drive motor 35 does not apply an excessive extra weight onto the steering axle 30. As a result, the steering system according to the invention is very responsive and remains powerful enough. Preferably, a temperature sensor is arranged in the steering system to monitor the winding temperature of the rotor 35b.

The steering system preferably uses 48V DC current, thus a motor drive unit is required to supply power to the direct drive motor 35. The motor drive unit is preferably integrated into the vehicle, for example, into the trunk of the vehicle, and motor drive unit can include a battery and/or a boost converter.

The motor shaft 35c is preferably connected to the steering axle 30 via a clutch 40, and the clutch 40 is preferably connected to the motor shaft 35c via a first bracket 41.

As an extension to the steering axle 30, the steering system according to the invention can include an inner column 32 and an outer column 34 arranged coaxial to each other and to the axis 37 of the steering axle 30. Between the inner column 32 and the outer column 34 a second bearing 49a can be arranged. Around the steering axle 30 further bearings, such as a third bearing 49b can be arranged.

An angle sensor 33, preferably an absolute rotary encoder, is mounted directly onto the steering axle 30. With the angle sensor 33 according to this preferred embodiment, the steering system according to the invention is capable to get an actual steering angle position even after a power loss, thanks to the design capabilities of the angle sensor 33. For diagnostic reasons, it is possible to add two angle sensors 33 to measure a difference between of the steering axle 30 and the rotor 35b. By using double windings for the direct drive motor 35, the redundancy of the steering system according to the invention can also be increased.

According to the preferred embodiment of FIGS. 3 and 4, the steering axle 30 and the angle sensor 33 is in connection via pulleys 42, 44 and a timing belt 43.

The steering system can further include means for fixing the parts of the steering system to each other, or to structural components of the vehicle. For example, a coupling 39 can be used to fix the position of the outer column 34 with respect to the direct drive motor 35. A second bracket 45 can be used to fix the position of the motor housing 36 of the direct drive motor 35 with respect to the steering axle 30. Furthermore, a third bracket 46 can be used to connect the direct drive motor 35 to the vehicle, i.e., to the chassis of the vehicle. A fourth bracket 47 can be used to mount the steering system as a whole to the chassis of the vehicle.

Figure 5:
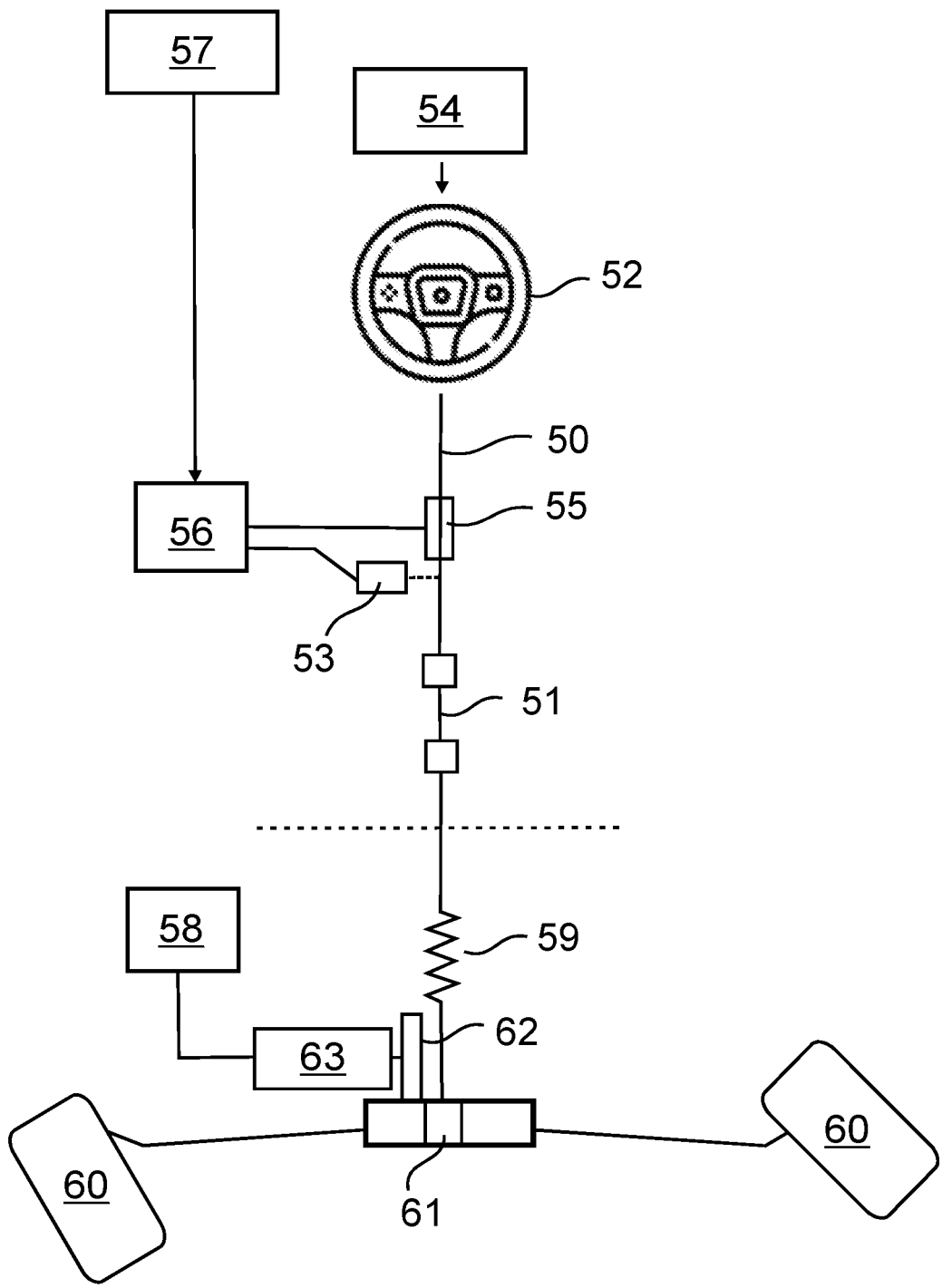
FIG. 5 is a schematic overview of a preferred steering system according to the invention with its connection to other vehicle parts.

FIG. 5 a schematic overview of a preferred steering system according to the invention showing the steering system with its connection to other vehicle parts. The preferred embodiment of the steering system according to FIG. 5 comprises a steering axle 50 attached to a steering wheel 52 for allowing manual driving of the vehicle by a human driver 54. A direct drive motor 55 is arranged on the steering axle 50 without gears, wherein the axis of rotation of the direct drive motor 55 is coaxial to the axis of rotation of the steering axle 50. The steering system according to FIG. 5 further includes an angle sensor 53 for determining an exact position of the steering wheel 52.

The direct drive motor 55 and the angle sensor 53 are both connected to a controller assembly 56 that receives a feedback position signal from the angle sensor 53 and gives a command to the direct drive motor 55 in order to steer the vehicle, preferably the command contains a target current value of the direct drive motor 55 to be reached. The controller assembly 56 can be connected to an external network 57 such as the internet, a cloud or a database for receiving further information regarding the steering of the vehicle.

In order to steer the vehicle, the steering axle 50 needs to be connected with a wheel 60 of the vehicle. According to FIG. 5, the steering axle 50 and the wheels 60 are connected via an intermediate shaft 51 having a torque sensor 59. The torque sensor 59, for example, can be implemented as a torsion bar. The wheels 60 and the torque sensor 59 are preferably attached to a rack and pinion 61 that transfers the steering torque applied to the steering axle 50 to the wheels 60.

Furthermore, a means for electric power assisted steering (EPAS) 63 can also be connected to the rack and pinion 61 via gears 62 to further assist the steering of the wheels 60. The means for electric power assisted steering 63 is preferably receives signals from an electric control unit (ECU) 58.

Figure 6:
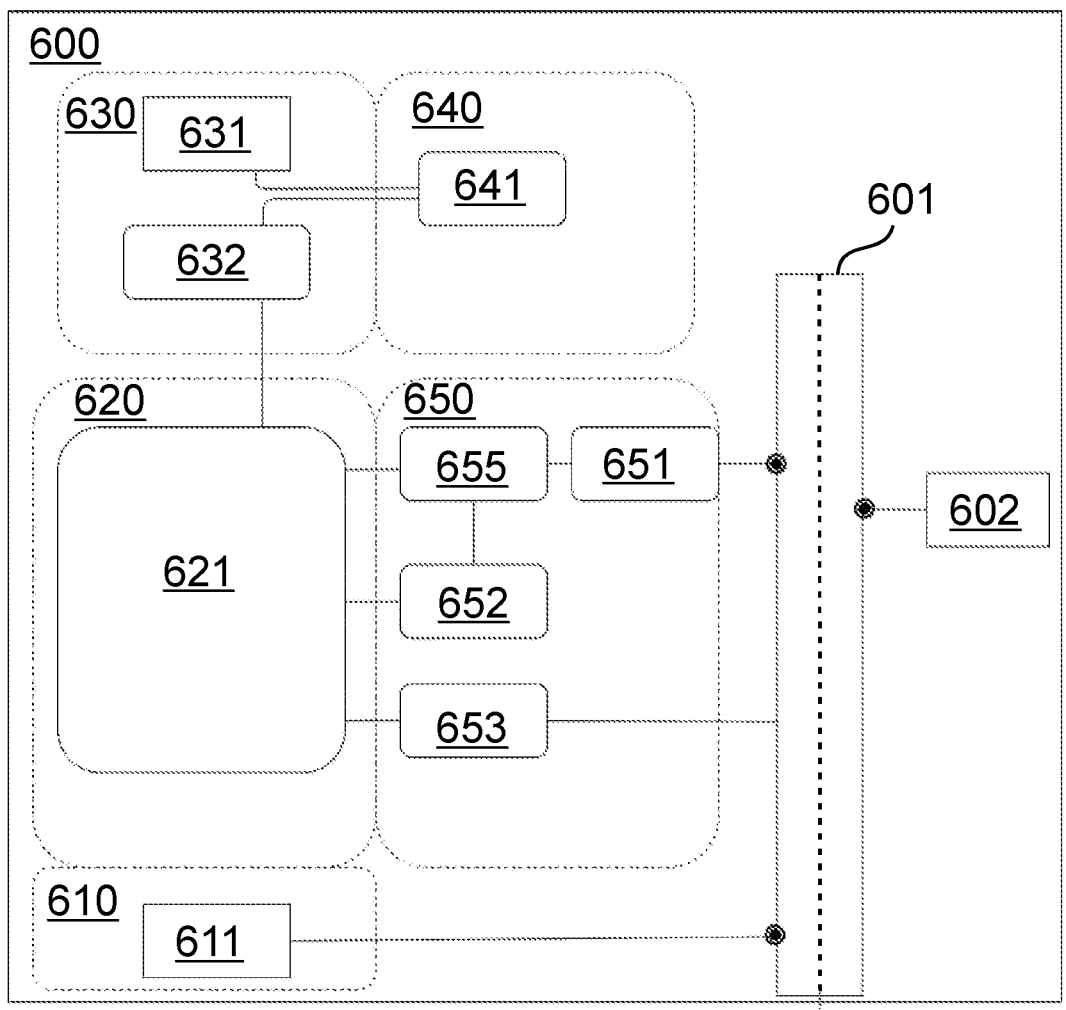
FIG. 6 is an exemplary architecture of the steering system according to the invention.

FIG. 6 shows a preferred architecture 600 of the steering system according to the invention. The boxes having dashed boundaries indicate various locations within the vehicle, where parts of the steering system and parts associated with it are located. The possible locations are a driver's seat 610 of the vehicle, a passenger's seat 620 of the vehicle, a trunk 630 of the vehicle, a center console 640 of the vehicle and a steering column 650 of the vehicle.

At the driver's seat 610 a means for manual steering of the vehicle is arranged, preferably a steering wheel 611 that is connected to a steering axle 601. The steering wheel 611 can apply a torque on the steering axle 601 to steer the vehicle.

At the passenger's seat 620, preferably below the passenger's seat 620, a controller assembly is arranged, which is in connection with elements of the steering column 650 and a power supply 632 arranged preferably in the trunk 630 of the vehicle. In the trunk 630 of the vehicle a main battery 631 is also arranged. Preferably, the main battery 631 and the power supply 632 are both connected to a means for emergency stop 641, which is preferably implemented in a form of a button arranged in the center console 640 for easy access.

At the steering column 650, a direct drive motor 655 is arranged that is connected to the steering axle 601 via a clutch 651, preferably a non-slip clutch. In this arrangement, the direct drive motor 655 can apply a torque on the steering axle 601 to steer the vehicle. The direct drive motor 655 is preferably thermally coupled to a temperature sensor 652. The steering column 650 also includes a steering angle sensor 653 that is in a mechanical contact with the steering axle 601.

The direct drive motor 655 is preferably in connection with the controller assembly 621 to receive control signals, and the controller assembly 621 is further connected to the temperature sensor 652 to monitor the temperature of the direct drive motor 655 and to the steering angle sensor 653 to receive information about the rotational position of the steering axle 601.

The steering axle 601 can be further connected to a servomotor 602 of the vehicle, preferably an original servomotor 602 of the vehicle. The servomotor 602 is also capable of applying a torque on the steering axle 601 just like the direct drive motor 655 and the steering wheel 611.

Figure 7:
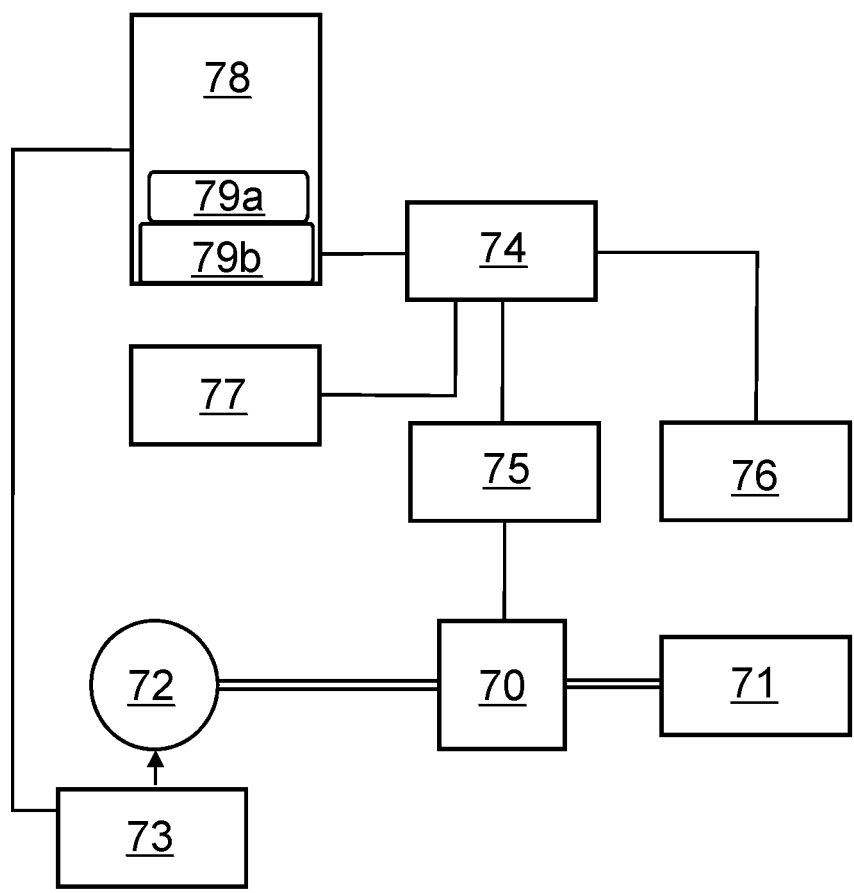
FIG. 7 is an exemplary architecture of the steering system according to the invention included in a simulation environment.

FIG. 7 shows an exemplary architecture of the steering system according to the invention included in a simulation environment, because testing of an autonomous vehicle is not necessarily restricted to road testing. The steering system according to the invention can also be used for simulation testing, in the course of which the steering system is mounted on a test bench, preferably a HIL (Hardware in the Loop) test bench, and drivers can interact with the steering system in a similar manner as during a test drive.

Test benches, especially HIL test benches can allow the following tests:
- testing of the robustness of a controller assembly of the steering system,
- testing of the robustness of the mechanical structure of a direct drive motor 75,
- testing override functionalities and possible driver interventions by using means for manual steering such as a steering wheel 71 and actuators such as a pedal 76,
- testing the complete steering system before building it into an actual vehicle, and
- testing a new firmware, i.e., hardware or software components before their planned update.

As it can be seen from the above list, test benches allow testing and fine-tuning of hardware components of the steering system according to the invention, including testing of the reliability and durability of the hardware components before building the steering system into a vehicle. Furthermore, a test bench equipped with the steering system can also be used for testing and validation of a sub-system or the whole steering system. The test bench equipped with the steering system according to the invention can also be used for training test drivers before they join in a real-word testing of the vehicle. Loop testing also allows simulating various driving scenarios.

A driver or user can interact with interfaces such as a steering wheel 71 or any other means for manual steering, and one or more actuators such as pedals 76. The steering wheel 71 is connected to a steering axle 70, which is equipped with a direct drive motor 75. The direct drive motor 75 is controlled by a controller assembly including a drive-by-wire unit 74. The drive-by-wire unit 74 is preferably in connection with the pedals 76.

In order to provide realistic conditions, a vehicle ECU (Electronic Control Unit) emulator 77 and an EPAS (Electric Power Assisted Steering) emulator 73 is included in the testing architecture. The EPAS emulator 73 is used for creating an emulated assisted steering 72 to the steering axle 70.

For generating input parameters to the controller assembly, a simulation computer 78 is used that has a simulation software 79a and virtual sensors 79b. The simulation computer 78 preferably provides virtual sensor data, traffic scenarios, and a vehicle model to the controller assembly. The controller assembly is capable to run in this simulated environment and it can receive signals and data from the simulation computer 78 and the vehicle ECU emulator 77, and it can give commands to the direct drive motor 75 and the pedals 76. The commands are preferably translated by the drive-by-wire unit 74 for the direct drive motor 75 and for the pedals 76. The EPAS emulator 73 preferably also uses simulation data and inputs from the simulation computer 78.

In the following, characteristics of a disengagement are discussed in more detail.

As it has already been discussed above, the steering system according to the invention has at least two predefined states characterizing different driving situations, such as parking, urban driving, etc. Each predefined state has at least one predefined disengagement limit to maintain safe operation of the vehicle being tested.

Disengagement refers to an action, wherein the autonomous driving should be stopped and manual override of the vehicle is necessary for safety reasons. The predetermined disengagement limits can be hardware limits or other predefined thresholds that might indicate that the behavior of the vehicle is turning unstable, or that the autonomous driving is becoming dangerous, e.g., due to an error.

When a disengagement limit is reached or exceeded, manual override of the autonomous driving is preferred in order to ensure the safety of the testing personnel, the passengers of the vehicle being tested, the vehicle itself and any other person, vehicle or object along the planned route of the test vehicle.

It has been recognized that different driving situations require different disengagement limits in order to ensure safe testing and also to reduce the possibility for an unnecessary manual intervention. Different driving situations serve as a basis for the predefined states.

Figure 8:
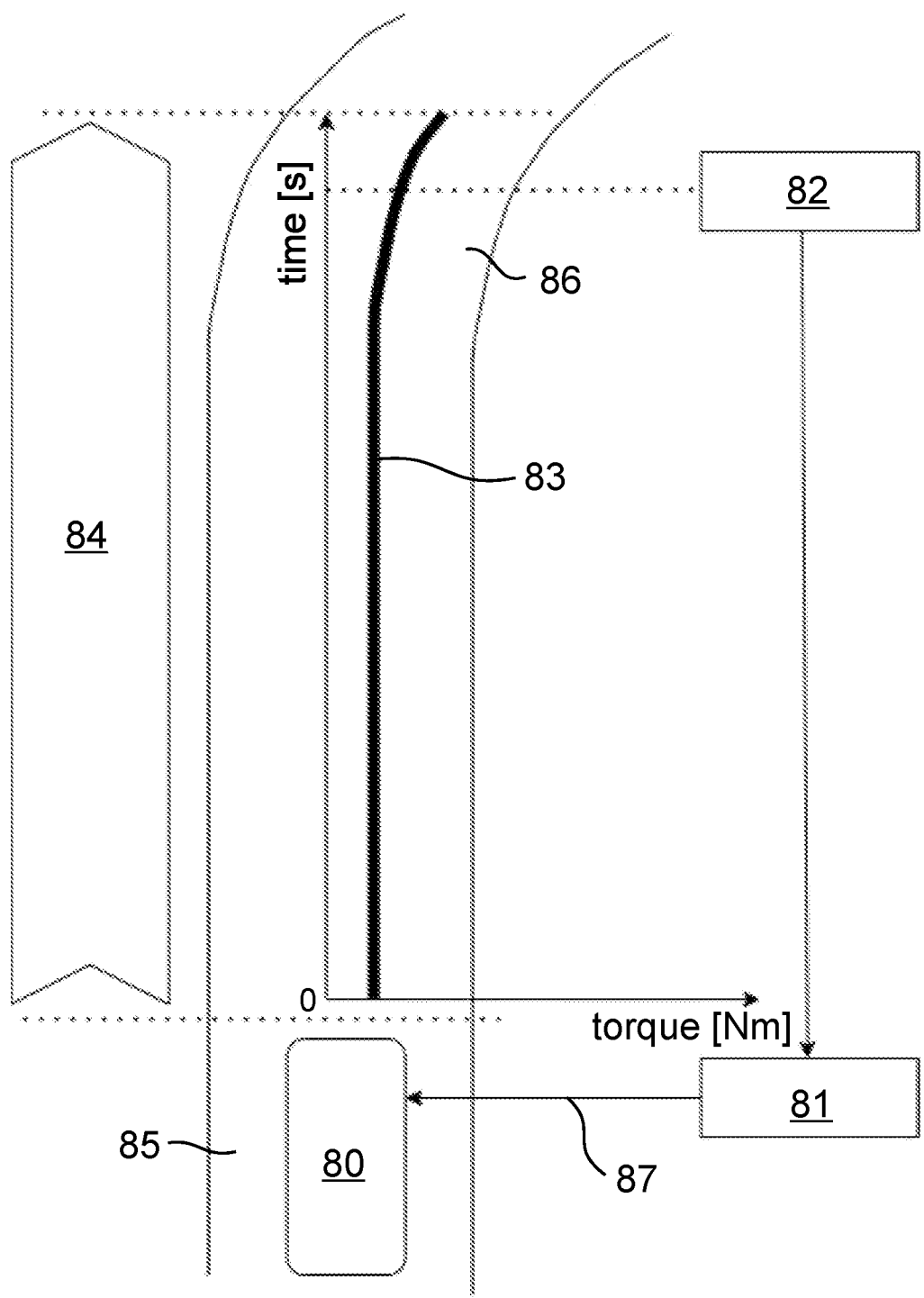
FIG. 8 is a schematic drawing showing a disengagement event based on an estimation.
Figure 9:
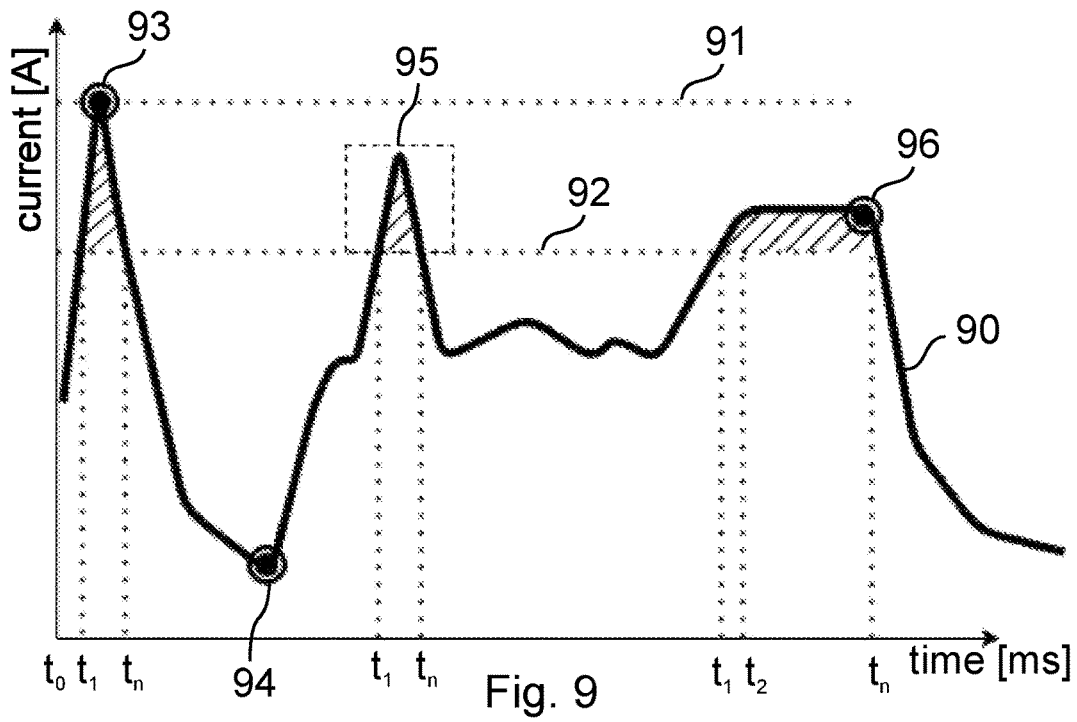
FIG. 9 is a graph showing possible disengagement events based on a current signal of the direct drive motor.

The predefined states are preferably determined based on at least one state parameter, such as the speed (see point a) below), lateral acceleration, yaw rate, and/or longitudinal acceleration of the vehicle. Besides the state parameters, the parameters listed below under points b)-f) can also serve as a basis to determine which predefined state characterizes the vehicle at a given time point, i.e., what is the actual predefined state of the vehicle.

a) Speed of the vehicle. The speed of the vehicle was found to be an important factor in characterizing the necessity of a disengagement action, thus the speed of the vehicle is preferably to be monitored. Monitoring of the vehicle's speed also allows for a steering control based on the speed of the vehicle (i.e., speed-dependent vehicle control). The speed of the vehicle can be derived by a displayed vehicle speed originating from the ABS block and transmitted through a CAN bus. Other methods can also be used to determine the speed of the vehicle, such as tapping a Hall-effect sensor attached to the wheels of the vehicle and receive the analog signals of the sensors corresponding to the wheel ticks. Auxiliary speedometers are also known and available on the market for determining the speed of the vehicle. Preferably, multiple methods can be used simultaneously to have a redundant speed measurement. The safety level of the speed signal preferably corresponds to an ASIL-D level to achieve the best possible safety, thus redundant speed signal perception is desired.

b) Reference position or torque. In a steering system having a high-level controller and a low-level controller, the high-level controller sends a motion profile, i.e., a reference signal, to the low-level controller including prescribed values of a control parameter, such as a target position or a target torque to be achieved. The high-level controller calculates the acceleration required to reach the target values and alerts the driver to take over the control from the autonomous driving system in case the calculated acceleration is above a safe limit, which indicates unexpected or erroneous behavior of the vehicle or the autonomous driving software. The alert can be sent in a form of a visual and/or audio sign. In case of such an alert, the low-level controller preferably continues to control the vehicle within its low-level limiters ensuring the safety of the vehicle. This way too rapid increase in the target values can be avoided.

c) Speed of the steering wheel or the steering axle. The speed of the steering wheel or the steering axle preferably can be calculated by using either a steering position sensor of the vehicle, or a position sensor of the direct drive motor. The steering position sensor of the vehicle or the position sensor of the direct drive motor is preferably an angle sensor. For the sake of safety and redundancy, it is possible to use both the steering position sensor and the position sensor of the direct drive motor. The maximum speed of the steering wheel preferably defines a disengagement limit that cannot be exceeded; otherwise, the low-level controller immediately alerts the driver and disengages the automated steering function. Preferably, at least one steering angle sensor is attached to the steering axle. Even more preferably, at least two steering angle sensor is attached to the steering axle, one attached to the direct drive motor, and an other one originally mounted into the vehicle (built-in steering wheel position sensor). As it has been discussed above, for safety reasons the use of redundant signals is preferred.

d) Target position of the steering wheel or the steering axle. Preferably, the target position of the steering wheel or the steering axle is also monitored, primarily by the position sensor of the direct drive motor preferably having a high precision (±0.05-0.1°. Secondarily, the built-in steering wheel position sensor can also be used for monitoring the target position of the steering wheel, although it usually has a lower precision, thus the use of the built-in steering wheel position sensor is preferably a fall-back option only.

e) Estimation of the possibility of steering. The autonomous software preferably calculates and sends the target position or target torque value to the direct drive motor, preferably through the high-level and the low-level controller. If the request of the high-level controller is ignored by the low-level controller, because reaching the target value of the position or torque estimated to exceed a disengagement limit, the steering system according to the invention preferably notifies the driver before the disengagement happens, thus allowing time for the driver to perform the necessary safety actions. FIG. 8 shows an example, wherein a disengagement limit is expected to be exceeded in a curve.

f) Current of the direct drive motor. The low-level controller converts the output current of the direct drive motor to torque. In connection with the current of the direct drive motor more than one disengagement limit can be defined. For example, a hardware limit that cannot be exceeded, as it results in a disengagement when it happens. Besides hard-limits (i.e., limits that cannot be exceeded), soft-limits can also be defined as disengagement limits. Soft-limits can preferably be exceeded, for example, for a given time. In case of soft-limits, disengagement only happens if the time when the limit was exceeded is above a limit, or a cumulative value of the parameter exceeds a limit. FIG. 9 shows exemplary effects of reaching and/or exceeding different disengagement limits related to the current of the direct drive motor.

One or more of the above parameters can be used to determine into which predefined state does the vehicle belong to at a given time point. For example, the speed of the vehicle can solely be a decisive factor; in other cases, a combination of other parameters can also be used.

As it has been mentioned above, FIG. 8 shows a disengagement action based on an estimation of the possibility of steering, i.e., if safe steering is possible with the prescribed target parameters, or a future disengagement is to be expected.

An autonomous driving software of a vehicle 80 usually comprises a route planning unit, wherein route planning unit has a road model 84 within a perception distance. Based on the road model 84, an absolute steering torque 83 can be calculated that will be required to keep the vehicle 80 on the road 85 even when the road 85 is curved. As the vehicle 80 approaches a curve 86, the torque required to drive the vehicle 80 along the road 85 increases. The expected future torque can be calculated by an estimation unit 81, preferably by a steering possibility estimator, and compared with a disengagement limit 82 in connection with the steering torque. If the estimation of the torque results in that the disengagement limit 82 is expected to be exceeded at a later time point, i.e., when the vehicle 80 is in the curve 86, an alert 87 can be sent to the driver of the vehicle 80, who can resume manual control before entering into the curve 86. Besides the torque acting on the steering wheel, other parameters can also be calculated in respect of their predetermined disengagement limits.

FIG. 9 is a graph illustrating disengagement events based on a current signal 90 of the direct drive motor. The current signal 90 constitutes output current values of the direct drive motor and shown as a function of time. In the low-level controller, the output current of the direct drive motor is converted to a torque that is acting on the steering axle. Similarly, to torque as discussed in relation to FIG. 8, a predetermined disengagement limit can also be associated with the output current of the direct drive motor. For the output current, a predetermined disengagement limit can be a hardware limit 91 (a hard-limit that cannot be exceeded), and/or a current threshold 92 (a soft-limit that can be exceeded under certain conditions). The hardware limit 91 is preferably defined by the hardware of the direct drive motor, and as the hardware limit 91 is a hard-limit, when the hardware limit 91 is reached, disengagement occurs (see disengagement point 93 in FIG. 9). According to the example of FIG. 9, the hardware limit 91 of the output current is set to 30 A, thus as soon as the actual value of the output current reaches the hardware limit 91 of 30 A at disengagement point 93, a disengagement occurs. When the output current returns below the predetermined disengagement limits, i.e., below the hardware limit 91 and also below the current threshold 92, the autonomous drive can be re-activated (see re-activation point 94).

The current threshold 92 is a soft-limit, thus it can be exceeded, for example for a predefined time interval. If the current signal 90 exceeds the current threshold 92, preferably a timer is started and it runs as long as the current signal 90 exceeds the current threshold 92. If a time interval measured by the timer is shorter than the predefined time interval, then no disengagement occurs (see point 95 without a disengagement). FIG. 9 also shows a case, wherein the current signal 90 exceeds the current threshold 92 for a longer time interval, thus a disengagement occurs at disengagement point 96.

In case of a soft-limit, alternatively a cumulative excess signal can be measured on the basis of the time interval measured by the timer and the output current values exceeding the current threshold 92. The cumulative excess signal can be calculated as an integral value of the current signal 90 exceeding the current threshold 92, i.e., the areas denoted by stripes. Instead of an integral, other methods approximating the denoted areas can be used. For example, a sum of output current values can be multiplied by the time interval measured by the timer.

When a disengagement action is initiated, e.g., due to an exceeded disengagement limit or a critical, unrecoverable error, a signal is sent to the human driver to take over the control of the vehicle, and a driver handover window is started. During driver handover window the steering system and the autonomous software continues to drive the vehicle, until the human driver takes over the control of the vehicle, or until the driver handover window times out. The human driver can take over the control by manually steering the vehicle, or by using an activation lever, or any other means indicating a driver override. If the driver handover window times out without the human driver taking over the control of the vehicle, a safety maneuver is started.

If there is a critical error and the steering system and the autonomous software cannot control the vehicle reliably anymore, the safety maneuver is immediately started without initiating a driver handover window. Even in this case, a signal is sent to the human driver to take over the control of the vehicle as soon as possible. The signal in this case is preferably a more aggressive, more noticeable signal.

The safety maneuver is preferably implemented on the drive-by-wire controller as a lower-level safety function. During the safety maneuver, the last received steering request is hold if the steering was engaged by an advanced driver-assistance system (ADAS), and no acceleration request is accepted. However, if a braking request was active at the time of error, then the braking request is kept. If no braking was actuated at the time of error, but the ADAS was controlling the brake, a slight deceleration is requested to decelerate the vehicle during the safety maneuver.

Any time, when the human driver initiates a driver override or pushes the activation lever, the safety maneuver stops and the human driver gets manual control over the vehicle.

As an example, when the safety maneuver is started, the last steering angle position is kept, and the longitudinal speed of the vehicle is decreased until the vehicle is stopped.

In a further example, when the safety maneuver is started, the vehicle is requested to find a parking position, slow down, and stop the vehicle. Preferably, a hazard light of the vehicle is activated.

The predefined states can be based on different operational environments that occur during driving a vehicle. Such predefined states can be, for example, driving on a highway, urban driving, suburban driving, parking, closed-track driving, etc. Different predefined states might require setting different disengagement limits according to the characteristics of each driving situation. A decision to determine an actual predefined state of the vehicle can be made on the basis of one or more of parameters a)-f) above. The decision can be made solely on one parameter, such as the speed of the vehicle, or on a basis of a combination of the above parameters.

For example, a decision about the actual predefined state of the vehicle can be made by a decision-making unit, wherein the decision-making unit preferably has inputs such as a vehicle speed, information from an external inertial measurement unit (IMU) such as a lateral acceleration, a yaw rate, and/or a longitudinal acceleration of the vehicle.

Preferably, the decision-making unit receives map data (e.g., SD or HD map data) of the environment of the vehicle, which is preferably fused with high precision location data (e.g., real-time kinematic positioning (RTK) or GPS data) of the vehicle and/or visual data. The visual data is preferably derived from a camera and it can include information based on traffic signs (e.g., speed limits), and it can improve the reliability of the decision. The decision-making unit can implement a specific neural network or any other machine learning algorithm which is trained for determining an actual state of the vehicle, thus a change in the state of the vehicle can also be detected.

The precision and the reliability of the decision can be improved by including additional parameters in the decision, thus decreasing a possibility of a false classification of the predefined state of the vehicle. Optionally, the following parameters and measurements can be further included in the decision and can also serve as a basis of determining disengagement limits.

Most of the vehicles are equipped with torque sensors (TSU sensors), such as a torsion bar, measuring a torque of the vehicle. By monitoring the signal of the torque sensor, decision-making unit has a feedback from the torque applied by the human driver. During a test drive, both the human driver and the direct drive motor can apply a torque on the steering axle, in a completely autonomous drive, the vehicle usually detects the torque applied by the direct drive motor as a driver input, even if the human driver does not apply any force on the steering wheel or any other manual steering means. In case of a possible disengagement, it is preferred to know whether the human driver, the direct drive motor, or both applied torque on the steering axle. An additional logic layer can be added to determine whether the human driver, the direct drive motor, or both applied torque on the steering axle. The additional logic layer can get input from the torque sensor to help with the decision.

Information about a speed of the steering axle (also known as a rackspeed velocity) induced by the servo drive of the vehicle might increases the robustness of the decision-making unit. A maximum allowable speed limit of the servo drive can also be a disengagement limit, where the controller alerts the human driver and disengages the direct drive motor from the steering system.

Any kinds of mechanical, acoustic, and/or optical sensor (i.e., strain sensor) can be attached to the steering wheel or to a surrounding of the steering wheel. Based on a signal of the strain sensor a disengagement can be initiated. For example, over a certain decibel limit, a loud shout (e.g., "STOP") could be detected by the steering system leading to an immediate disengagement of the lateral control. This would allow the safety of a passenger of the vehicle, for example by initiating an emergency braking and safe stopping of the vehicle and could be used in fully autonomous vehicles without steering wheels or other means for manual driving.

Figure 15:
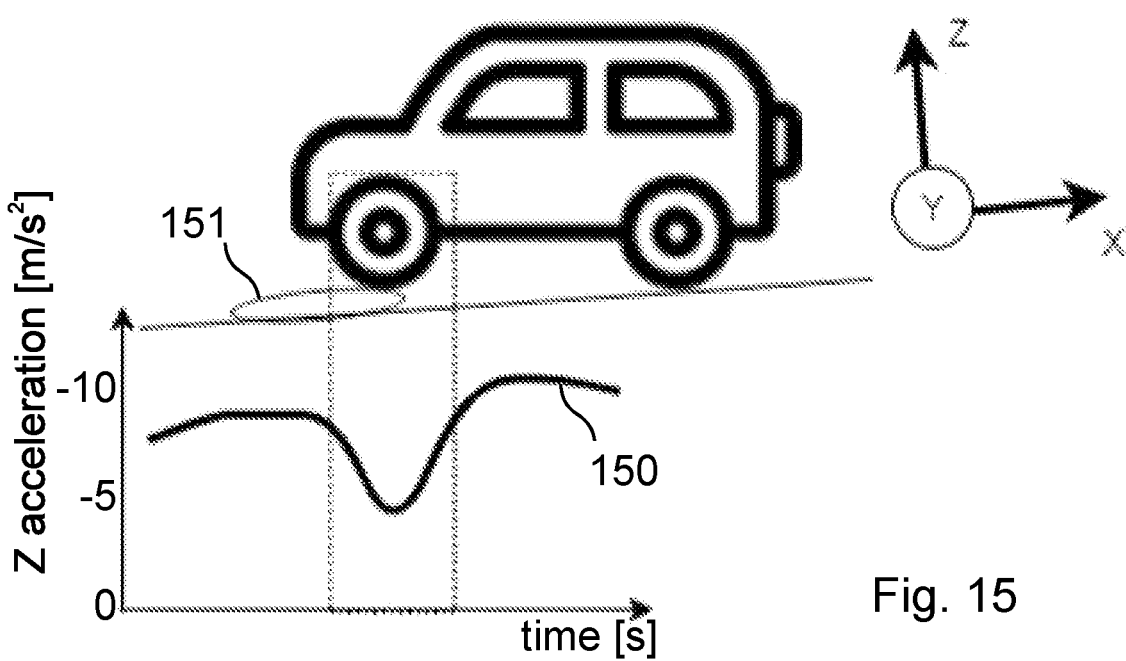
FIG. 15 is an illustration of an effect of a speed bump on a signal of vertical acceleration.

Preferably, each test vehicle is equipped with an external IMU sensor for being capable of self-drive. IMU sensors can monitor a pitch, a roll, and/or a yaw of the vehicle, thus can be also useful for determining external noises, speed bumps, rocks, which on the one hand are momentary increasing the required torque from the direct drive motor, but on the other hand do not pose any danger. Events such as hitting a rock or a speed bump should not be a reason for a disengagement, thus inputting the signals of one or more IMU sensors into the decision-making unit can reduce the risk of an unnecessary disengagement. An effect of a speed bump on the torque signal is shown in FIG. 15.

Figure 12:
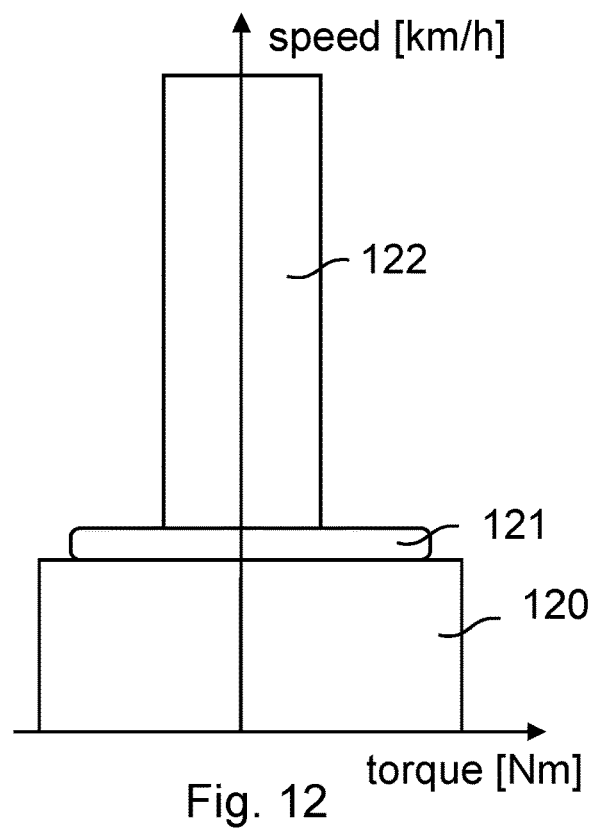
FIG. 12 is an illustration of two different predefined states with a bridge state in between, and typical disengagement limits of each state in respect to torque.
Figure 13:
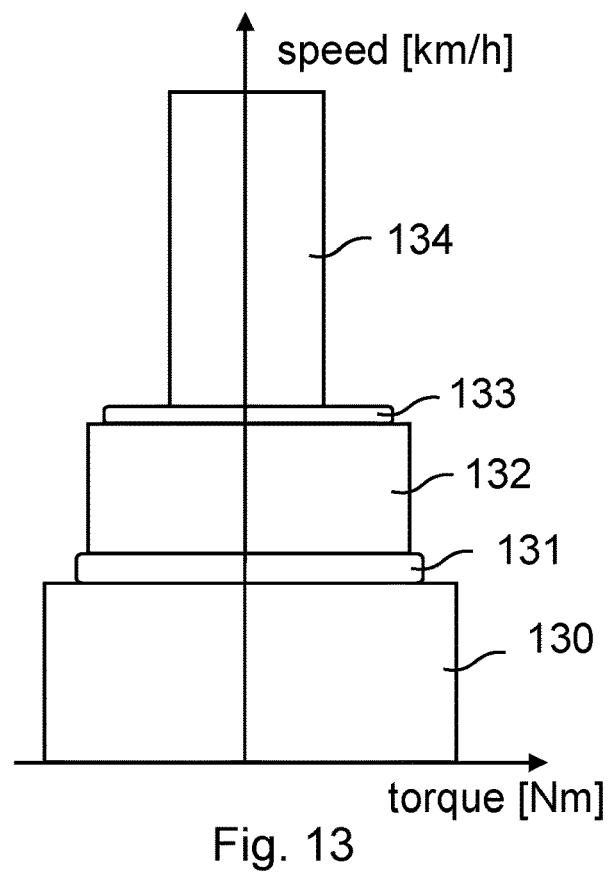
FIG. 13 is an illustration of three different predefined states with bridge states in between, and typical disengagement limits of each state in respect to torque.
Figure 14:
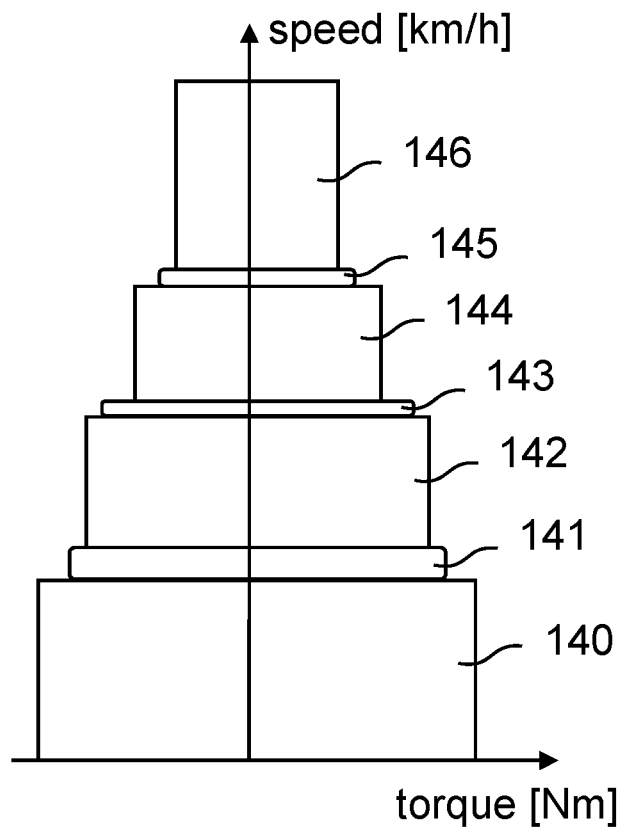
FIG. 14 is an illustration of four different predefined states with bridge states in between, and typical disengagement limits of each state in respect to torque.

The steering system according to the invention has at least two different predefined states. In the following a few examples of typical predefined states are described in more detail. FIGS. 12, 13 and 14 also show preferred embodiments of the steering system having two, three and four predefined states, respectively.

A possible driving scenario for an autonomous vehicle is driving on a closed track. Closed tracks are usually used for testing autonomous vehicles, because on a closed track no public traffic is present, thus the test can be carried out in a safe and secure environment. In a state of closed track driving, it is possible to turn off all the disengagement limits and testing the vehicle's true self-driving abilities. Such test can be carried out even without a human driver inside of the vehicle. Even if disengagement limits are turned off or set to a value that cannot be reached, a human driver can be in the vehicle and can override the autonomous operation of the vehicle via the means for manual steering (e.g., a steering wheel) of the steering system according to the invention, in order to keep the vehicle itself safe in case of an unexpected software error.

With the state of closed track driving, vehicle manufacturers or vehicle testers can equip their test vehicles, even their fully automated, driver-less vehicles, with the steering system according to the invention for their test days. This way features such as a lane keeping assist, an emergency overtaking, accident avoiding and other automated driving features can be tested. A human driver can supervise the test from the inside of the vehicle and intervene in case of an emergency to prevent an accident and a possible damage of the vehicle.

An other predefined state can be a state of parking, which can include driving in a parking lot. In case of parking or when a vehicle is operated in a parking lot, the speed of the vehicle is relatively low, typically it is in the range of 0-15 km/h, however higher torque might be needed to navigate the vehicle. In this state the level of risk is relatively low, partially due to the lower speeds, and human drivers should override the steering system easily and steer the vehicle manually. The peak torque can be in the range of ±10 Nm, preferably in the range of ±8 Nm, or ±6 Nm. The peak torque can depend on various factors such as longitudinal forces, lateral forces, linear damping, inertial effects, front lift, friction, etc. The required average torque from the direct drive motor is typically higher than 4 Nm.

A further predefined state can be a state of urban driving that also can include driving in a traffic jam. In urban areas such as in cities and towns the maximum speed is typically limited to 50 km/h, however the exact speed limits are regulated by national laws and regulations. Driving in an urban area thus corresponds to movements with a moderate speed, however unexpected situations can be more frequent than at parking, e.g., due to pedestrians. Urban environments can also include various road conditions and routes such as steep streets, roundabouts, streets with sharp turns or curves. Even in an urban environment, emergency braking should be possible, thus the speed range of the state of urban driving should be between 0 km/h and 50 km/h. As the vehicle moves with a moderate speed in an urban environment, the power assist can provide sufficient torque for the direct drive motor for smooth operation. The reaction time of a human driver, especially a trained test driver is good enough to override the operation without a lane departure. The hands-on operation is not a necessary use case, but recommended. During AEB (automatic emergency braking) activation the self-drive software must keep the vehicle in its lane, while the steering system should handle situations at junctions and roundabouts.

An even further state can be defined for moving in a suburban area. In suburban areas the speed limits normally allow higher speeds than in urban areas, thus in suburban areas the speed of the vehicles is typically in the range of approx. 50-70 km/h. In the speed range of 50-70 km/h the existing steering assists usually have the highest performance, i.e., if no limitation is applied then the steering wheel can rotate with the maximum possible velocity. In this speed range such a fast movement of the steering wheel results in a lane-departure, thus a high level of attention and the ability of fast intervention is expected from a human driver to control the vehicle. Thus, if no limits are applied in the steering system, the human driver must be ready to take over the control of the vehicle any time. For this reason, the human driver is expected to continuously keep a hand on the steering wheel or any other means for manual steering. In case of hands-on driving, the reaction speed of the human driver is significantly reduced.

In suburban areas, where a road has more than one lane and vehicles are driving with a speed of 50-70 km/h, the human driver has more time to perform a successful override or in case of a disengagement, the human driver has more time to take over the control of the vehicle. In the state of suburban driving the required average torque during the testing from the direct drive motor is in the range of approx. ±3-6 Nm.

Driving on a highway can also serve as a basis for a predefined state. Contrary to the aforementioned predefined states, on highways the vehicles are allowed to travel at higher speeds than on other types of roads, and the maximum allowed speed usually depends on national traffic regulations. A typical maximum speed is 130 km/h, however there are countries where no-speed limit highways also exist, such as in Germany. For this reason, the vehicle is expected to be driven at high speed in an environment, wherein other vehicles are also moving with a high speed. A possible speed range to cover is between 0 km/h and 130 km/h. The speed range for driving in a highway have to include lower speeds as well, in extreme cases even 0 km/h, because an automated vehicle should be able to perform an AEB (automatic emergency braking) on highway as well. It means the steering system must be active and be able to react when a vehicle in front of the test vehicle is completely stopped. The steering system according to the invention can handle sharp curves, for example at an interchange or at a junction. The steering system can also guide the vehicle in sloped curves on a highway.

In a normal operation, the vehicle is supposed to keep its lane on the highway, even if an emergency braking situation occurs. Based on artificial intelligence or sensor data from, for example, a radar, a vision sensor, a lidar, etc. and by using prediction models, the test vehicle can perform a lane change even in an emergency situation to avoid an accident. The change of lane can be performed either autonomously or with an override from the human driver. Before performing the lane changing maneuver, the target lane must be checked by the sensors and the driver as well.

In case the testing is performed to analyze a lane keeping ability of the vehicle, then for a single lane change a light steering to left or right (approx.)±15° with a quick and accurate positioning is necessary to achieve the best comfort for the human driver and the passengers of the vehicle. For a double lane change more dynamic movements are required.

In the state of highway driving, the peak torque of the direct drive motor of the steering system is not too high, normally it is around 7 Nm. The resistance of such torque can be easily conquered by a human driver. If the human driver wants to take over the control of the test vehicle in the state of highway driving, the steering wheel must be turned very carefully and smoothly in order to avoid entering into another lane. Due to the high speeds occurring on a highway, extra care must be taken not to apply excessive force or torque on the steering wheel to avoid any unwanted lane change.

In cases, when the steering system is not working properly and does not want to let the human driver steer the vehicle, the human driver must overcome the torque of the steering system. If the driver needs to use a torque of more than 10 Nm to override the steering system and perform a disengagement, the test vehicle might perform a lane change in the process.

The direct drive motor can use an average torque up to 2-3 Nm for lane keeping and for a single lane change. In such cases insufficient torque, e.g., a torque less than 1.1 Nm, does not turn the vehicle. This, and friction in the steering system can result in angular and lateral errors, which can be avoided by providing torques above the average torque value. This phenomenon can affect other predefines states as well.

In an exemplary state of highway driving, the following limits apply. If the speed of the vehicle is between 25 m/s and 37.5 m/s for more than 100 ms, the vehicle is expected to be in the state of highway driving. The disengagement limits in connection with the state of highway driving can be the following:

the yaw rate of the vehicle must not exceed±0.11 rad/s for more than 100 ms, the lateral acceleration of the vehicle must not exceed±4.2 m/s$^2$ for more than 100 ms, the steering wheel position must not exceed±0.262 rad for more than 100 ms, the steering wheel torque must not exceed±5 Nm for more than 100 ms, and the steering wheel torque manually applied to the steering wheel must not exceed±2.5 Nm for more than 100 ms.

Exceeding any one of the above limits results in a disengagement and the human driver needs to take over the control of the vehicle.

A possible further predefined state can be a state of emergency maneuver. This state should cover a speed range from 0 km/h till the highest possible speed typically allowable on a highway, for example, 130 km/h or 200 km/h. The emergency state corresponds to an emergency situation, in which even a fast and sharp turn of the vehicle is expected, i.e., in order to avoid an accident. The torque applied by the direct drive motor of the steering system can be in a range of ±10 Nm.

Different predefined states typically have different disengagement limits, thus in a case when the state of the vehicle changes, the disengagement limits can also change drastically, leading to an unstable vehicle operation or a sudden disengagement action due to surpassing a disengagement limit of the new state.

To avoid problems with changing the states, intermediate bridge states can be introduced between the different predefined states allowing a smooth transition of the disengagement limits between the predefined states.

The controller assembly might use a decision-making unit, for example, a neural network to detect and determine the appropriate actual predefined stage of the vehicle based on the available data, e.g., actual values of a control parameter. In cases when a change in the actual predefined stage is detected, a bridge command can be generated in order to apply a bridge function to allow a smooth transition of the disengagement limits between the predefined states. If there is a failure in the control of the vehicle, or the bridge command cannot be delivered within a certain time, the steering system preferably alerts the human driver and gives back the control.

The decision-making unit of the steering system needs to identify the possible predefined states and their changes, and should apply intermediate bridge states between the predefined states. Preferably, the decision-making unit should be able to recognize situations such as a traffic jam on a highway. If the decision-making unit defines the situation as an emergency, it can immediately switch from a predefined stage of highway driving to a state of urban driving including traffic jams. In such situations preferably the maximum possible speed limits are available for the controller assembly to steer the vehicle.

Figure 10:
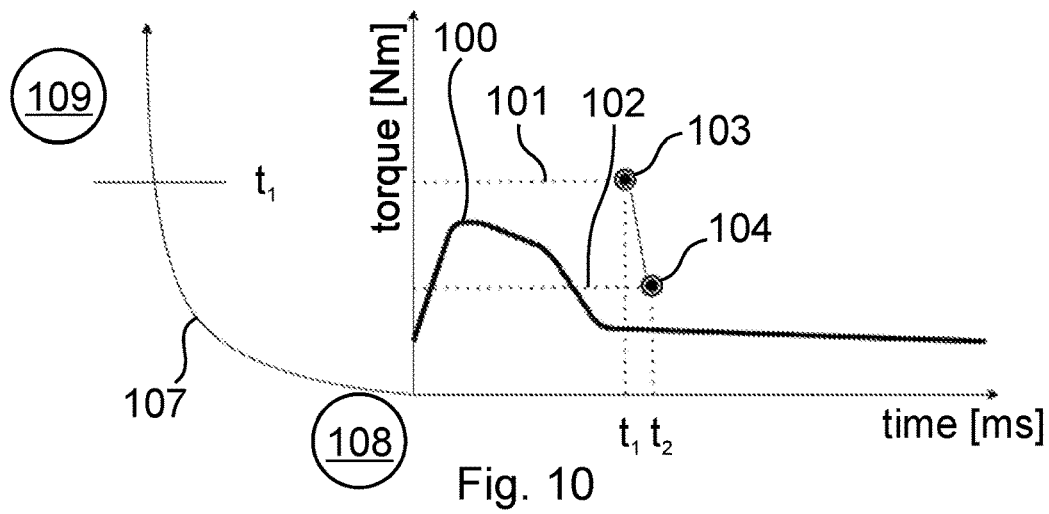
FIG. 10 is an illustration of an effect of changing of states without a bridge state between the states.
Figure 11:
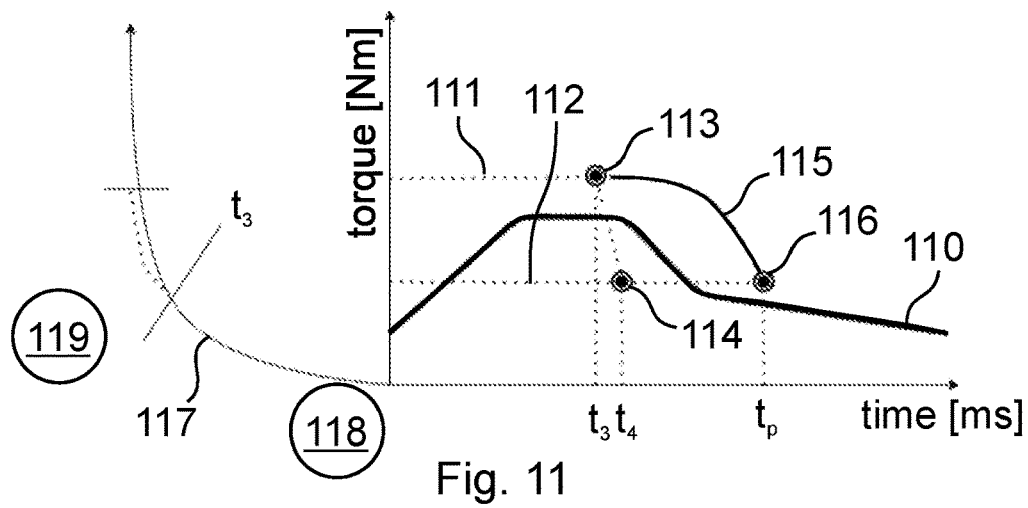
FIG. 11 is an illustration of an effect of changing of states with a bridge state between the states.

For example, bridge states can be applied between the state of parking and the state of urban driving, between the state of urban driving and the state of suburban driving, and also between the state of suburban driving and the state of highway driving. FIG. 10 and FIG. 11 illustrate the effects of changing the state of the vehicle with and without bridge states.

FIG. 10 gives an example, wherein no bridge states are used in the steering system. According to the example, at first, the vehicle is driving at a lower, for example, urban or suburban speed (e.g., 40 km/h as indicated by a first road sign 108), which allows higher applied torques 100, then the vehicle takes along a curve 107 to enter a road with a higher speed limit (e.g., 110 km/h as indicated by a second road sign 109). Due to the change of the speed of the vehicle, the actual predefined state of the vehicle also changes from a first state corresponding to urban or suburban driving to a second state corresponding to highway driving, for example, at $t_1$. Along with the change of the actual predefines state, the applicable disengagement limits also change, i.e., from a first disengagement limit 101 corresponding to a first state to a second disengagement limit 102 corresponding to the second state. According to the example shown in FIG. 12, the first disengagement limit 101 of the first state is higher than the second disengagement limit 102 of the second state, as it has been shown that in a highway large applied torques might lead to an unwanted lane change thus it is to be avoided. As it can be seen in FIG. 10, the change of state occurs after the curve 107, thus the torque 100 applied on the steering system is already decreased to a level below both of the disengagement limits 101, 102. Thus, in this case no disengagement occurs in points 103, 104 either with or without bridge states.

On the contrary, FIG. 11 gives an example, wherein the vehicle moves in a curve 117, and a change of state occurs during the curve 117 (at $t_3$). In this example, a speed limit in the first part of the curve 117 is lower (e.g., 40 km/h as indicated by a first road sign 118) then in the second part of the curve 117 (e.g., 90 km/h as indicated by a second road sign 119). In this case the torque 110 applied on the steering system is higher than the second disengagement limit 112 of the second state at the time when the vehicle enters the second state. This would lead to an immediate disengagement in the middle of the curve 117, i.e., in disengagement point 114, which can be dangerous, if the human driver does not take immediate action to take over the control of the vehicle. Such a situation can even lead to a deviation from the road or the lane. Such a sudden disengagement can be avoided by bridge states that allow a smooth transition of the disengagement limits. A bridge state preferably includes a bridge function 115 defining a transition between the disengagement limits 111, 112 of the states by connecting a bridge starting point 113 with a bridge ending point 116 with the bridge function 115. As it can be seen, the bridge function 115 defines a smooth transition between the first and second disengagement limits 111, 112 by expanding the transition time. Thus, the torque 110 can remain below the bridge function 115 and thus no disengagement occurs.

The bridge function can be any monotonous function connecting the disengagement limits 111, 112 of the states, for example, the bridge function 115 can be a linear or a non-linear function.

FIG. 12 gives an example of the steering system according to the invention having two predefined states corresponding to different driving situations. The driving situations according to FIG. 12 include a first state 120 corresponding to a low-speed driving, which preferably includes parking situations and driving in an urban environment. A typical speed of the vehicle is in the range of approx. 0-50 km/h due to a usual speed limit of 50 km/h in urban areas. The torque to be applied on the steering axle is usually in the range of ±8-10 Nm, because especially in case of parking, low speeds are typical, but the vehicle is expected to take even sharp turns that require higher torque on the steering axle. A disengagement limit regarding to the applied torque can preferably be set to ±10 Nm. In other embodiments of the steering system according to the invention, the first state 120 can be divided into further states, i.e., into separate states on the one hand corresponding to parking, and on the other hand corresponding to urban driving, just like in FIG. 14.

A second state 122 of FIG. 12 corresponds to another driving situation, such as a high-speed driving, covering scenarios of driving in a suburban area with typical driving speeds of approx. 50-70 km/h, driving on major roads with typical driving speeds of approx. 70-90 km/h, and also driving on a highway or motorway, wherein the typical driving speeds are in the range of approx. 90-200 km/h. Preferably, in the second state 122 vehicles typically move with a speed in the range of approx. 50-200 km/h. In other embodiments of the steering system according to the invention, the second state 122 can be divided into further states, just like in FIGS. 13 and 14.

In the second state 122, the speed of the vehicle is relatively high and less torque is expected to be applied on the steering axle compared to the first state 120. Too high torques at high speeds can lead to an unintentional change of lanes, thus are to be avoided. In the second state 122, a torque range of ±3-6 Nm is expected; thus, the disengagement limit can preferably be set to ±4 Nm or ±6 Nm.

As it has been discussed in connection with FIG. 11, a bridge state 121 can be introduced to smooth the transition of the disengagement limits between the states 120, 122. According to FIG. 12, a bridge state 121 is introduced between the first state 120 and the second state 122.

Preferably, the steering system according to FIG. 12 also includes an emergency state (not shown) to handle emergency situations. The emergency state preferably covers a speed range of 0-200 km/h and has a torque range comparable to the first state 120, preferably with a disengagement limit of ±10 Nm.

FIG. 13 gives an example of the steering system according to the invention having three predefined states corresponding to different driving situations. The driving situations according to FIG. 13 include a first state 130 corresponding to a parking situation (state of parking), wherein the typical speed of the vehicle is in the range of approx. 0-5 km/h, and the torque to be applied on the steering axle is usually in the range within ±10 Nm as in case of parking low speeds are typical, but the vehicle is expected to take even sharp turns that require higher torque on the steering axle. A disengagement limit regarding to the applied torque can preferably be set to ±10 Nm.

A second state 132 of FIG. 13 corresponds to another driving situation, such as driving in an urban environment (state of urban driving). In urban environment vehicles typically move with a speed in the range of approx. 5-50 km/h, as urban areas usually have a speed limit around 50 km/h. In the state of urban driving less torque is expected to be applied on the steering axle compared to the state of parking, however sharp turns can be also expected, thus in the state of urban driving a torque range of ±8 Nm is expected; thus, the disengagement limit can be set to ±8 Nm.

A third state 134 illustrated in FIG. 13 corresponds to high-speed driving such as driving in a suburban area with typical driving speeds of approx. 50-70 km/h, driving on major roads with typical driving speeds of approx. 70-90 km/h, and also driving on a highway or motorway, wherein the typical driving speeds are in the range of approx. 90-200 km/h. In other embodiments of the steering system according to the invention, the third state 134 can be divided into further states, just like in FIG. 14.

Considering the traffic regulations of different countries, different speed limits are applicable for the third state 134. For example, in some countries such as in Germany, no speed limit highways also exist. Preferably the upper speed limit of the state of high-speed driving corresponds to the highest allowed speed or the highest possible speed of a road vehicle in a particular country. In case of high-speed driving lower torques are expected in normal operation as high-speed roads tend to have less curves and less sharp turns. For this reason, the disengagement limits of the state of high-speed driving regarding torque are lower than as of the state of urban driving or as of the state of parking. As an example, the disengagement limits in the third state 134 can be set to ±4 Nm.

As it has been discussed in connection with FIG. 11, bridge states 131, 133 can be introduced to smooth the transition of the disengagement limits between neighboring states 130, 132, 134. According to FIG. 13, a first bridge state 131 is introduced between the first state 130 and the second state 132, and a second bridge state 133 is introduced between the second state 132 and the third state 134.

Preferably, the steering system according to FIG. 13 also includes an emergency state (not shown) to handle emergency situations. The emergency state preferably covers a speed range of 0-200 km/h and has a torque range comparable to the first state 130 (i.e., the state of parking) with a similar disengagement limit of ±10 Nm.

FIG. 14 gives an example of a steering system having more predefined states than the steering systems of FIGS. 12. and 13. FIG. 14 shows four different predefined states (states 140, 142, 144, 146) with three bridge states 141, 143, 145 in between.

The steering system according to FIG. 14 comprises a state for parking as a first state 140, wherein the characteristics of the first state 140 are similar as of the first state 130 of FIG. 13 with a disengagement limit of approx.±9-10 Nm.

The second state 142 of FIG. 14 preferably corresponds to a state of urban driving, wherein the speed range is approx. 5-50 km/h. The characteristics of the second state 142 of FIG. 14 correspond to the characteristics of the second state 132 of FIG. 13 with a disengagement limit of approx.±7-8 Nm.

Above 50 km/h, the steering system according to FIG. 14 comprises two more predefined states, a third state 144 corresponding to suburban driving and a fourth state 146 corresponding to driving on a highway. The third state 144 (state of suburban driving) preferably covers a speed range of approx. 50-70 km/h, and a maximal allowed torque is preferably in the range of 3-6 Nm, thus the third state 144 has a disengagement limit of approx.±6 Nm.

The fourth state 146 (state of highway driving) preferably corresponds to a speed range of approx. 70-200 km/h. In cases where the speed limits for driving on a highway are higher than 200 km/h, the fourth state 146 preferably covers that higher speed range as well. However, for safety reasons, it is reasonable to limit the maximal possible speed of the vehicle, i.e., performing a disengagement if the vehicle tries to drive faster than a preset highest speed limit. As it has been discussed above, in case of high-speed driving, even a relatively low torque applied on the steering axle can lead to dangerous situations including leaving the lane. For this reason, a maximal allowed torque is preferably in the range of 2-4 Nm, thus the fourth state 146 preferably has a disengagement limit of approx.±4 Nm.

Between the different predefined states 140, 142, 144, 146 three bridge states 141, 143, 145 are arranged, wherein each bridge state 141, 143, 145 has a bridge function that defines a smooth, monotonous transition between the disengagement limits of the different predefined states 140, 142, 144, 146. The bridge function can be a linear function or any other monotonous function, and different bridge states can have different bridge functions. In cases, when the difference between the disengagement limits of the predefined states 140, 142, 144, 146 are larger, the bridge functions preferably correspond to longer time periods, allowing a longer and less steep transition, thereby decreasing the probability of the occurrence of a disengagement event.

Preferably, the steering system according to FIG. 14 also includes an emergency state (not shown) to handle emergency situations. The emergency state preferably covers a speed range of 0-200 km/h (i.e., the total allowable speed range) and has a torque range comparable to the first state 140 (i.e., the state of parking) with a similar disengagement limit, namely with a disengagement limit of ±9-10 Nm.

In other preferred embodiments of the steering system according to the invention, the third state 144 and the fourth state 146 can correspond to different speed ranges. For example, the third state 144 can preferably correspond to a speed range of approx. 50-90 km/h with a disengagement limit of approx.±5-6 Nm, wherein the fourth state 146 can preferably correspond to a speed range of approx. 90-200 km/h with a disengagement limit of approx.±3-4 Nm.

FIG. 15 gives an illustration on the effect of a vehicle driving over a speed bump. Due to its height, the speed bump 151 results in a change in the vertical acceleration 150 (Z acceleration) of the vehicle, according to FIG. 15, the acceleration in the direction of axis Z changes. A speed bump 151 causes a characteristic change in the signal of the vertical acceleration 150 as it is shown in the graph of FIG. 15. If the decision-making unit receives signals of the vertical acceleration 150, then it can easily identify that change in the vertical acceleration 150 is a result of a speed bump Although crossing over a speed bump 151 also results in an increased torque, it should not be a reason to initiate a disengagement.

Figure 16:
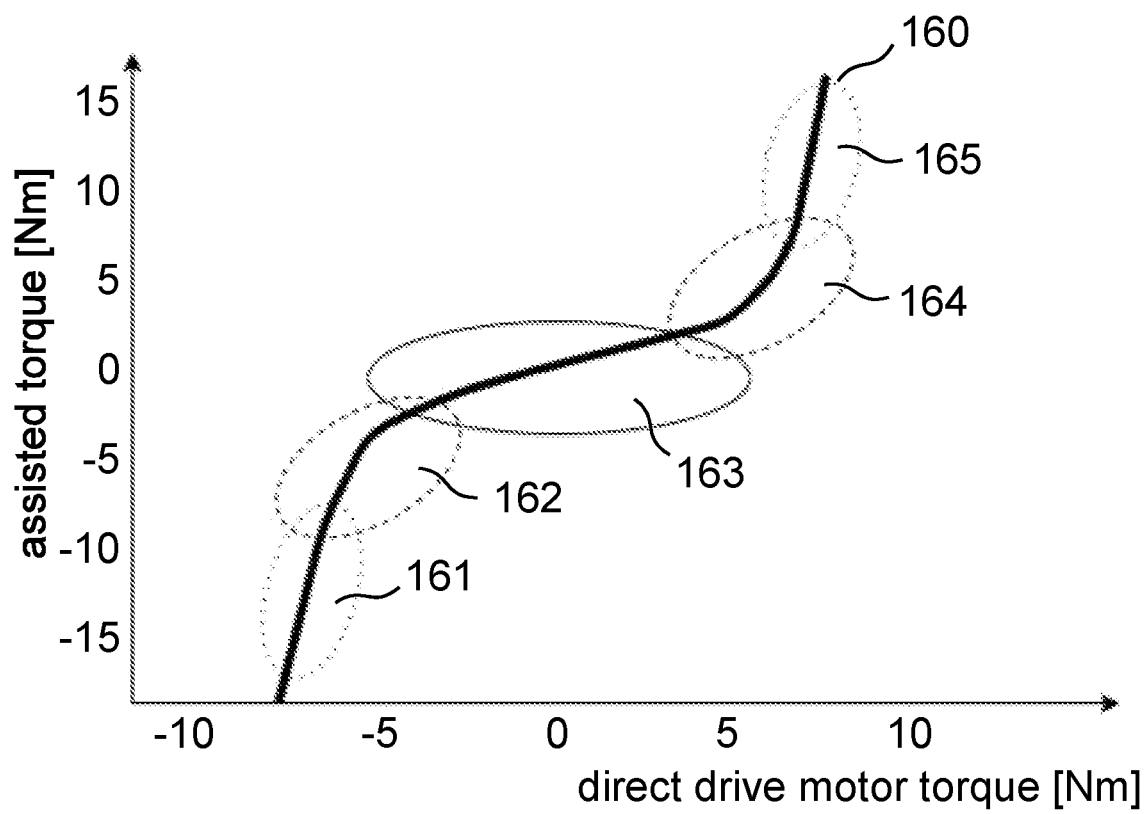
FIG. 16 is a graph illustrating a relationship between a torque of the direct drive motor and the EPAS assisted torque for different predefined states.

FIG. 16 shows a graph of a typical distribution of torque between the direct drive motor of the steering system according to the invention and the EPAS assisted torque in different driving situations, wherein the X axis shows the torque applied by the direct drive motor on the steering axle and the Y axis shows the torque applied by the EPAS. The driving situations include a first state 161 corresponding to parking, a second state 162 corresponding to urban or suburban driving, a third state 163 corresponding to highway driving, a fourth state 164 corresponding to urban or suburban driving, and a fifth state 165 corresponding to parking.

It can be seen that in the third state 163 corresponding to highway driving almost no torque is required from the EPAS's side, but the direct drive motor can provide all the necessary torque required for driving on a highway, wherein the torque applied by the direct drive motor is also limited, i.e., it is in the range of ±5 Nm. Contrary to this, in parking situations, see states 161, 165, a higher-level torque (up to ±10 Nm) is required by both the direct drive motor and the EPAS.

Figure 17:
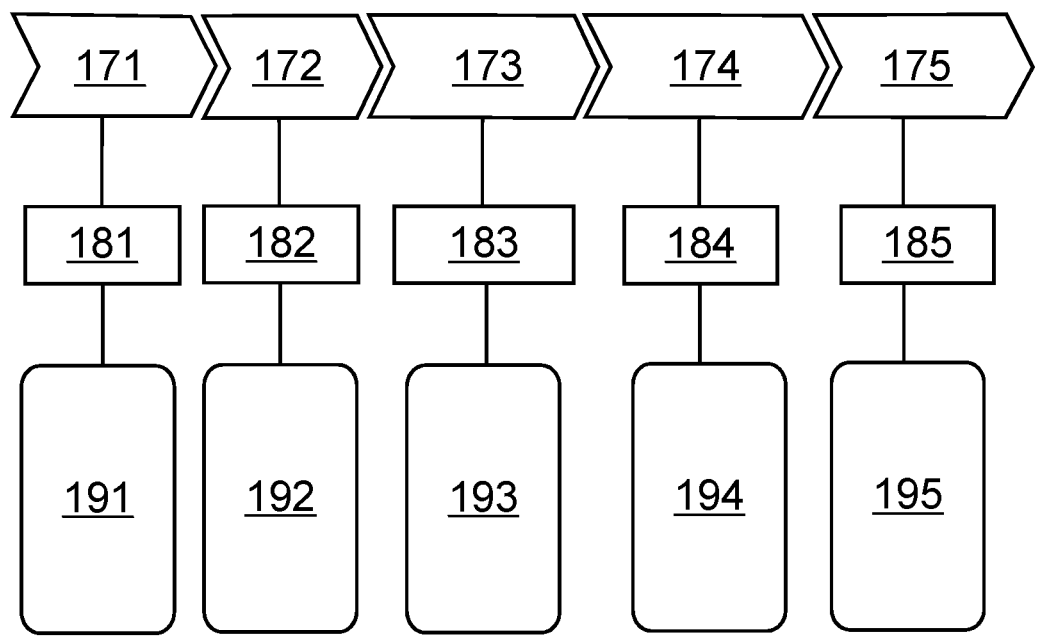
FIG. 17 is an illustration of various uses of the steering system according to the invention and the relations of the uses.

FIG. 17 is an illustration of various uses (i.e., uses 181, 182, 183, 184, 185) of the steering system according to the invention. In order to allow a vehicle to perform a fully automated, autonomous drive on a public road, preferably the following steps are to be taken to ensure the safety of the vehicle, its passengers, the transported goods and also any other vehicle, people, and objects along the route of the autonomous vehicle.

As a first step 171, drivers can be trained for testing autonomous vehicles, so that they can familiarize themselves with the task. This first step 171 can be carried out using any training and/or simulation environment, preferably, a steering system according to the invention can be used as an interface between the driver and the autonomous driving software, wherein the steering system is preferably attached to a test bench. Thus, a first use 181 of the steering system according to the invention can be a driver training. A first goal 191 of the first step is to have trained drivers who are familiar with the vehicles and the steering system, thus can carry out test drive in a safer manner than regular drivers.

As a second step 172 of testing, vehicles can be equipped with the steering system according to the invention, thus as a second use 182, the steering system according to the invention can be used for evaluating of the steering system and its components without any autonomous driving software. The second step 172 allows testing of the steering system without limiters that are normally introduced by the autonomous software, thus hardware limits can be tested and estimated, and the steering system can be operated with variable inputs. Thus, the second goal 192 associated with the second step 172 is to determine the hardware limits of the steering system according to the invention.

As a third step 173 of testing, tests can be carried out with an autonomous simulation software, thus as a third use 183, the steering system according to the invention can be used in a simulated driving environment (see FIG. 7). In a simulation environment robustness of the autonomous software and the hardware of the steering system can be tested. Furthermore, with the help of the steering system according to the invention, the effects of a driver override can also be tested. The third step 173 can also be used for further training of the test drivers, because in a simulation environment driving limitations, disengagement limits can also be included and simulated, furthermore, faults can also be added to the simulation, so the test drivers can learn how to react in such situations. Thus, the third goal 193 associated with the third step 173 is to test the robustness of the hardware, software, and firmware; continue training of the test driver in real-like situations, and also to allow thorough testing of a driver override.

A fourth step 174 of testing can be a fine-tuning of the steering system, preferably via closed track driving. Thus, as a fourth use 184, the steering system according to the invention can be used in closed track driving and for fine-tuning the hardware and software of the steering system. The fourth goal 194 associated with the fourth step 174 of the testing is to define the disengagement limits for each predefined state.

A fifth step 175 of testing can be a testing on public roads, wherein the steering system according to the invention is built into a test vehicle, preferably provided by any manufacturer, which serves as a fifth use 185 of the steering system according to the invention. As a fifth goal 195 associated with the fifth step 175, is to test a completely autonomous operation of the vehicle. In this case a human driver is preferably present in the vehicle, alert and ready for taking over the control if necessary. The focus of the fifth step 175 of testing can be on the autonomous software, however the steering system according to the invention ensures that even in an emergency situation the human driver can intervene and avoid any possible accidents.

The invention also relates to a method of disengaging a direct drive motor of the steering system according to the invention from a manual steering means. The method comprises a step of commanding the direct drive motor of the steering system to achieve a prescribed value of a control parameter, wherein the control parameter is preferably a position of the manual steering means, a torque on the manual steering means, a force on the manual steering means, a speed of the manual steering means, or a current of the drive motor.

The method further comprises a step of monitoring an actual value of the control parameter and a step of generating a difference value between the prescribed value of the control parameter and the actual value of the control parameter.

The method also comprises a step of initiating a disengagement if, based on the difference value, at least one predefined disengagement limit corresponding to an actual predefined state is reached.

The invention also relates to a data processing system comprising means for carrying out the steps of the method according to the invention.

The invention, furthermore, relates to a computer program product comprising instructions which, when the program is executed by a computer, cause the computer to carry out an embodiment of the method according to the invention.

The computer program product may be executable by one or more computers.

The invention also relates to a computer readable medium comprising instructions which, when executed by a computer, cause the computer to carry out an embodiment of the method according to the invention.

The computer readable medium may be a single one or comprise more separate pieces.

The invention is, of course, not limited to the preferred embodiments described in detail above, but further variants, modifications and developments are possible within the scope of protection determined by the claims. Furthermore, all embodiments that can be defined by any arbitrary dependent claim combination belong to the invention.

LIST OF REFERENCE SIGNS 10 steering axle
11 bearing
12 drive gear
13 angle sensor
14 reduction gearbox
15 motor
16 commutation encoder
17 first axis
18 second axis
20 steering axle
21 bearing
22 gears
23 angle sensor
25 direct drive motor
27 first axis
28 second axis
30 steering axle
31 bearing
32 inner column
33 angle sensor
34 outer column
35 direct drive motor
35a stator
35b rotor
35c motor shaft
36 motor housing
37 axis
38 bearing housing
39 coupling
40 clutch
41 first bracket
42 pulley
43 timing belt
44 pulley
45 second bracket
46 third bracket
47 fourth bracket
48 bearing housing
49a second bearing
49b third bearing
50 steering axle
51 intermediate shaft
52 steering wheel
53 angle sensor
54 human driver
55 direct drive motor
56 controller assembly
57 external network
58 electric control unit (ECU)
59 torque sensor
60 wheel
61 rack and pinion
62 gears
63 electric power assisted steering (EPAS)
600 architecture
601 steering axle
602 servomotor
610 driver's seat
611 steering wheel
620 passenger's seat
621 controller assembly
630 trunk 631 main battery
632 power supply
640 center console
641 means for emergency stop
650 steering column
651 clutch
652 temperature sensor
653 steering angle sensor
655 direct drive motor
70 steering axle
71 steering wheel
72 emulated assisted steering
73 EPAS (Electric Power Assisted Steering) emulator
74 drive-by-wire unit
75 direct drive motor
76 pedals
77 ECU (Electronic Control Unit) emulator
78 simulation computer
79a simulation software
79b virtual sensors
80 vehicle
81 estimation unit
82 disengagement limit
83 absolute steering torque
84 road model
85 road
86 curve
87 alert
90 current signal
91 hardware limit
92 current threshold
93 disengagement point
94 re-activation point
95 point
96 disengagement point
100 torque
101 first disengagement limit
102 second disengagement limit
103 point
104 point
107 curve
108 first road sign
109 second road sign
110 torque
111 first disengagement limit
112 second disengagement limit
113 bridge starting point
114 disengagement point
115 bridge function
116 bridge ending point
117 curve
118 first road sign
119 second road sign
120 first state
121 first bridge state
122 second state
130 first state
131 first bridge state
132 second state
133 second bridge state
134 third state
140 first state
141 first bridge state
142 second state
143 second bridge state
144 third state
145 third bridge state
146 fourth state
150 vertical acceleration
151 speed bump
160 torque
161 first state
162 second state
163 third state
164 fourth state
165 fifth state
171 first step
172 second step
173 third step
174 fourth step
175 fifth step
181 first use
182 second use
183 third use
184 fourth use
185 fifth use
191 first goal
192 second goal
193 third goal
194 fourth goal
195 fifth goal

The invention claimed is:

1. A steering system for use in test driving of an autonomous vehicle, comprising a manual steering means configured to manually steer the vehicle, a steering axle attached to the manual steering means, and a direct drive motor controllably affecting a torque on the steering axle, wherein the direct drive motor has an axis of rotation being coaxial with the steering axle, characterized in that the steering system has at least two predefined states characterizing different driving conditions, wherein each predefined state has at least one predefined disengagement limit, and the steering system further comprises a controller assembly operable based on a control parameter, the controller assembly being configured to detect an actual predefined state of the vehicle, and the controller assembly including a motion controller configured to generate a command including a prescribed value of the control parameter to be reached, a motor drive unit configured to supply power to the direct drive motor based on the command received from the motion controller, and a feedback device configured to monitor an actual value of the control parameter and determining a difference value between the prescribed value of the control parameter and the actual value of the control parameter, and initiating a disengagement of the direct drive motor if, based on the difference value, the at least one predefined disengagement limit corresponding to the actual predefined state is reached.

2. The system according to claim 1, characterized in that the predefined states are determined based on at least one state parameter.

3. The system according to claim 2, characterized in that the at least one state parameter is the speed, lateral acceleration, yaw rate, and/or longitudinal acceleration of the vehicle.

4. The system according to claim 1, characterized in that the predefined states are further determined on the basis of a driving situation comprising at least one of a parking maneuver, a traffic jam, an urban driving, a suburban driving, a low-speed driving, a high-speed driving, an emergency maneuver, and a closed track driving.

5. The system according to claim 1, characterized in that the steering system has an intermediate bridge state (121, 131, 133, 141, 143, 145) between two predefined states providing a smooth transition between the disengagement limits (82, 101, 102, 111, 112) of the two predefined states.

6. The system according to claim 1, characterized in that the control parameter is a position of the manual steering means, a torque on the manual steering means, a force on the manual steering means, a speed of the manual steering means, or a current of the direct drive motor (25, 35, 55, 655, 75).

7. The system according to claim 1, characterized in that the motion controller comprises
- a high-level controller generating a motion profile comprising prescribed values of the control parameter for the direct drive motor (25, 35, 55, 655, 75), and
- a low-level controller for receiving the motion profile and generating the command including a prescribed value of the control parameter to be reached.

8. The system according to claim 7, characterized in that the controller assembly comprises a drive-by-wire unit (74) arranged between the high-level controller and the low-level controller for transforming the motion profile generated by the high-level controller into a signal receivable by the low-level controller.

9. The system according to claim 1, characterized in that the direct drive motor (25, 35, 55, 655, 75) is a permanent-magnet synchronous motor.

10. A method of disengaging a direct drive motor (25, 35, 55, 655, 75) of the steering system according to claim 1 from a manual steering means, the method comprising the steps of commanding the direct drive motor (25, 35, 55, 655, 75) of the steering system to achieve a prescribed value of a control parameter, monitoring an actual value of the control parameter, generating a difference value between the prescribed value of the control parameter and the actual value of the control parameter, and initiating a disengagement if, based on the difference value, at least one predefined disengagement limit (82, 101, 102, 111, 112) corresponding to an actual predefined state is reached.

11. The method according to claim 10, characterized in that the control parameter is a position of the manual steering means, a torque on the manual steering means, a force on the manual steering means, a speed of the manual steering means, or a current of the drive motor (25, 35, 55, 655, 75).

12. A data processing system comprising a means for carrying out the steps of the method according to claim 10.

13. A non-transitory computer program product comprising instructions which, when the program is executed by a computer, cause the computer to carry out the method of claim 10.

14. A non-transitory computer readable medium comprising instructions which, when executed by a computer, cause the computer to carry out the method of claim 10.

\* \* \* \* \*